United States Patent
Maeda

(10) Patent No.: US 10,074,980 B2
(45) Date of Patent: Sep. 11, 2018

(54) CONTROL APPARATUS

(71) Applicant: DAIKIN INDUSTRIES, LTD., Osaka-shi, Osaka (JP)

(72) Inventor: Chikara Maeda, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 274 days.

(21) Appl. No.: 14/915,002

(22) PCT Filed: Aug. 22, 2014

(86) PCT No.: PCT/JP2014/072026
§ 371 (c)(1),
(2) Date: Feb. 26, 2016

(87) PCT Pub. No.: WO2015/029906
PCT Pub. Date: Mar. 5, 2015

(65) Prior Publication Data
US 2016/0211665 A1 Jul. 21, 2016

(30) Foreign Application Priority Data
Aug. 28, 2013 (JP) .................... 2013-176637

(51) Int. Cl.
*H02J 3/14* (2006.01)
*G05B 15/02* (2006.01)
*H02J 13/00* (2006.01)

(52) U.S. Cl.
CPC .............. *H02J 3/14* (2013.01); *G05B 15/02* (2013.01); *H02J 13/0079* (2013.01);
(Continued)

(58) Field of Classification Search
CPC .................... H02J 3/14; G05B 15/02
(Continued)

(56) References Cited

U.S. PATENT DOCUMENTS

2003/0233201 A1* 12/2003 Horst ................ H02J 3/14
700/295
2011/0172841 A1 7/2011 Forbes, Jr.
2013/0090777 A1 4/2013 Lu et al.

FOREIGN PATENT DOCUMENTS

EP   1 372 238 A1   12/2003
JP   6-341690 A     12/1994
(Continued)

OTHER PUBLICATIONS

Liu, et al. Data center demand response: Avoiding the coincident peak via workload shifting and local generation, Performance Evaluation 70 (2013), Aug. 29, 2013; pp. 770-791.*

(Continued)

*Primary Examiner* — Mohammad Ali
*Assistant Examiner* — Joshua Sanders
(74) *Attorney, Agent, or Firm* — Global IP Counselors, LLP

(57) ABSTRACT

A control apparatus includes a receiving unit, a demand-response unit, a power consumption fluctuation unit, and a setting unit. The receiving unit receives a demand relating to power consumption from an energy management apparatus. The demand-response unit executes a demand-response control in order to adjust power consumption of facility devices set up in a property in accordance with the demand when the demand is received by the receiving unit. The power consumption fluctuation unit executes a non-demand-response control in order to increase or decrease power consumption of the facility devices regardless of the demand. The setting unit sets the non-demand-response control to active or inactive.

8 Claims, 11 Drawing Sheets

(52) U.S. Cl.
CPC ... *H02J 2003/143* (2013.01); *H02J 2003/146* (2013.01); *Y02B 70/3225* (2013.01); *Y02B 70/3266* (2013.01); *Y04S 20/222* (2013.01); *Y04S 20/224* (2013.01); *Y04S 20/242* (2013.01)

(58) Field of Classification Search
USPC ........................................................ 700/296
See application file for complete search history.

(56) References Cited

FOREIGN PATENT DOCUMENTS

| | | |
|---|---|---|
| JP | 11-316037 A | 11/1999 |
| JP | 2012-38295 A | 2/2012 |

OTHER PUBLICATIONS

International Search Report of corresponding PCT Application No. PCT/JP2014/072026 dated Sep. 22, 2014.
International Preliminary Report of corresponding PCT Application No. PCT/JP2014/012026 dated Mar. 10, 2016.
European Search Report of corresponding EP Application No. 14 83 9966.0 dated Apr. 19, 2017.

* cited by examiner

US 10,074,980 B2

CONTROL APPARATUS

CROSS-REFERENCE TO RELATED APPLICATIONS

This U.S. National stage application claims priority under 35 U.S.C. § 119(a) to Japanese Patent Application No. 2013-176637, filed in Japan on Aug. 28, 2012, the entire contents of which are hereby incorporated herein by reference.

TECHNICAL FIELD

The present invention relates to a control apparatus.

BACKGROUND ART

In the past, demand-response control has been performed for controlling facility devices located on a property, in response to a demand sent from a power company, as is shown in Japanese Laid-open Patent Application No. 2012-38295. The demand sent from the power company includes conditions relating to the target power consumption and to the time period (a predetermined time period) the target power consumption will be maintained. When a demand is received on the property, demand-response control of the facility devices is started in response to the demand. During the predetermined time period, when demand-response control is executed and the power consumption of the facility devices is maintained at the target power consumption, the property is given a predetermined incentive from the power company.

SUMMARY

Technical Problem

The facility devices are typically used in order to make the environment of the property more comfortable. The facility devices are also used with energy conservation taken into account. Specifically, the facility devices can be controlled under conditions desired by the user and/or conditions accounting for energy conservation, regardless of demand. When control regardless of demand is performed during demand-response control, there are cases in which the target power consumption stipulated by the demand cannot be achieved. The predetermined incentive is thereby not obtained, and as a result, it is difficult to control the facility devices effectively.

In view of this, an object of the present invention is to provide a control apparatus that makes effective control of facility devices possible during demand-response control.

Solution to Problem

A control apparatus according to a first aspect of the present invention comprises a receiving unit, a demand-response unit, a power consumption fluctuation unit, and a setting unit. The receiving unit receives a demand pertaining to power consumption from an energy management apparatus. When the demand is received by the receiving unit, the demand-response unit executes demand-response control. Demand-response control is control for adjusting the power consumption of facility devices located on a property, in response to a demand. The power consumption fluctuation unit executes non-demand-response control. Non-demand-response control is control for increasing or reducing the power consumption of the facility devices, regardless of the demand. The setting unit sets the non-demand-response control to active or inactive.

In this control apparatus, when a demand is received from the energy management apparatus, demand-response control is executed by the demand-response unit. The control (non-demand-response control) for increasing or reducing the power consumption of the facility devices regardless of demand can be set to active or inactive. The facility devices can thereby be effectively controlled under demand-response control.

A control apparatus according to a second aspect of the present invention is the control apparatus according to the first aspect, wherein the setting unit sets the non-demand-response control to inactive during a predetermined time span during which demand-response control is executed.

In this control apparatus, non-demand-response control is set to inactive during demand-response control. Reductions in incentive can thereby be avoided.

A control apparatus according to a third aspect of the present invention is the control apparatus according to the first aspect, wherein the control apparatus further comprises a determination unit. The determination unit determines whether or not to execute non-demand-response control during a predetermined time span during which demand-response control is executed. The setting unit sets the non-demand-response control to active or inactive on the basis of the result obtained by the determination unit.

In this control apparatus, a determination is made by the determination unit as to whether or not to execute non-demand-response control during a predetermined time span during which demand-response control is executed. Non-demand-response control is set, by the setting unit, to active or inactive on the basis of the result of determination by the determination unit. Preferred control can thereby be executed in accordance with the situation of power consumption at a time when a command relating to non-demand-response control is received.

A control apparatus according to a fourth aspect of the present invention is the control apparatus according to the third aspect, wherein the control apparatus further comprises an incentive information storage section, and a reducible-cost-estimation unit. The incentive information storage section stores information relating to an incentive received when conditions stipulated by the demand are satisfied. The reducible-cost-estimation unit estimates a cost that can be reduced due to non-demand-response control. The determination unit compares the information relating to an incentive and the costs estimated by the reducible-cost-estimation unit, and determines whether or not to execute non-demand-response control while demand-response control is being executed.

In this control apparatus, the price received as an incentive and the reducible cost (price) are compared, and a determination is made as to whether or not to execute non-demand-response control. The overall necessary cost can thereby be minimized by a profit received due to energy conservation, even when the demand-response contract cannot be complied with and no incentive is received.

A control apparatus according to a fifth aspect of the present invention is the control apparatus according to the fourth aspect, wherein the demand includes conditions relating to a predetermined time span during which demand-response control is executed. Non-demand-response control is energy conservation control. The reducible-cost-estimation unit estimates the cost that can be reduced due to non-demand-response control on the basis of the length of time from the time when energy conservation control is started to the ending time of the predetermined time span.

In this control apparatus, the cost that can be reduced due to non-demand-response control is estimated on the basis of the length of time from the time when energy conservation control is started to the ending time of the predetermined time span. A determination can thereby be made as to whether or not to execute non-demand-response control, with the advantages received due to energy conservation control being sufficiently taken into account.

A control apparatus according to a sixth aspect of the present invention is the control apparatus according to any of the first through fifth aspects, wherein the control apparatus further comprises a confirmation unit. The confirmation unit confirms whether or not non-demand-response control needs to be executed after demand-response control by the demand-response unit has ended. The power consumption fluctuation unit executes non-demand-response control when the confirmation unit confirms that non-demand-response control needs to be executed.

In this control apparatus, a confirmation is made by the confirmation unit as to whether or not non-demand-response control needs to be executed after demand-response control has ended, and, when it is confirmed that non-demand-response control needs to be executed, non-demand-response control is executed by the power consumption fluctuation unit. The facility devices can thereby be controlled under desired conditions soon after the end of demand-response control.

A control apparatus according to a seventh aspect of the present invention is the control apparatus according to any of the first through sixth aspects, wherein non-demand-response control includes at least one of energy conservation control, schedule control, and manual control. Energy conservation control is control based on the amount of solar radiation or the presence/absence of humans in the spaces where the facility devices are set up.

In this control apparatus, at least one of energy conservation control, schedule control and manual control is executed as non-demand-response control. The facility devices can thereby be controlled in a manner suited to the situation of the spaces.

Advantageous Effects of Invention

In the control apparatus according to the first aspect of the present invention, the facility devices can be effectively controlled under demand-response control.

In the control apparatus according to the second aspect of the present invention, reductions in the incentive can be avoided.

In the control apparatus according to the third aspect of the present invention, preferred control can be executed in accordance with the situation of power consumption at a time when a command relating to non-demand-response control is received.

In the control apparatus according to the fourth aspect of the present invention, the overall necessary cost can be minimized by a profit received due to energy conservation, even when the demand-response contract cannot be complied with and no incentive is received.

In the control apparatus according to the fifth aspect of the present invention, a determination can be made as to whether or not to execute non-demand-response control, with the advantages received due to energy conservation control being sufficiently taken into account.

In the control apparatus according to the sixth aspect of the present invention, the facility devices can be controlled under desired conditions soon after the end of demand-response control.

In the control apparatus according to the seventh aspect of the present invention, the facility devices can be controlled in a manner suited to the situation of the spaces.

DESCRIPTION OF EMBODIMENTS

<First Embodiment>

An energy management system 100 according to a first embodiment and a control apparatus 30 used in the energy management system 100 are described below with reference to FIGS. 1-7.

(1) Overall Configuration of Energy Management System

Figure 1:
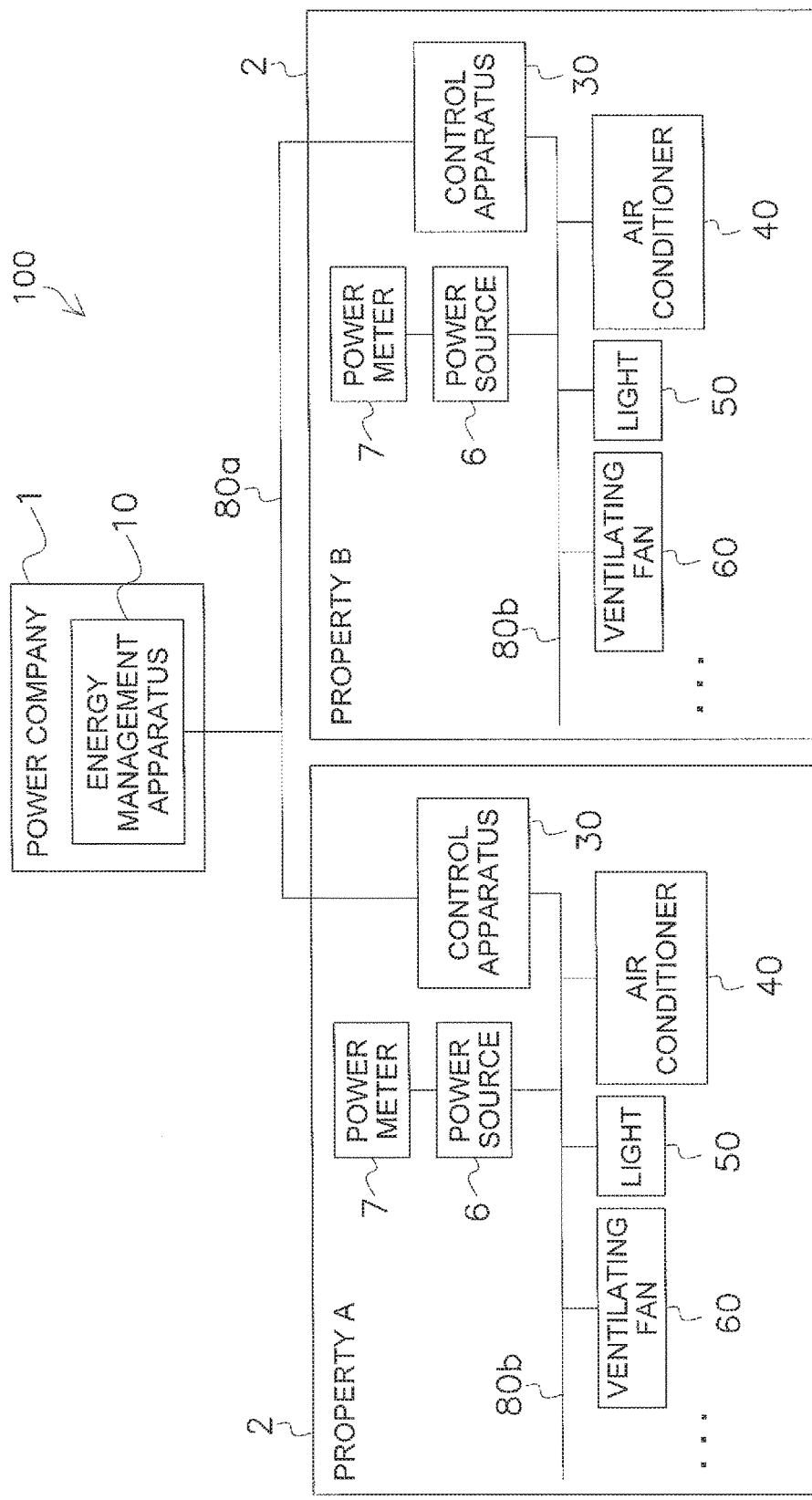
FIG. 1 is a schematic configuration view of an entire system according to a first embodiment.

FIG. 1 shows the energy management system 100 according to the present embodiment. The energy management system 100 is a system whereby a power company 1 manages the power consumption of a property 2.

In the energy management system 100, power is supplied from the power company 1 to a plurality of properties 2, 2. Each property 2 is a building in which a plurality of facility devices 40 to 60 are installed. For example, the properties 2 could be office buildings, tenant buildings, factories, common residences, and the like. In FIG. 1, two properties A, B are shown as properties 2 to which the power company 1 supplies power, but the number of properties is not limited to two. Specifically, the number of properties may be one, or may be three or more.

The power company 1 has an energy management apparatus 10. The properties 2 each have a control apparatus 30, a plurality of facility devices 40 to 60, a power source 6, and a power meter 7. The properties 2 also each have a human detection sensor (not shown) in the space where the facility devices 40 to 60 are installed. The power source 6 supplies power to the facility devices 40 to 60. The power meter 7 measures the amount of power supplied from the power source 6 to the facility devices 40 to 60. In the properties 2, the control apparatus 30 and the facility devices 40 to 60 are connected via a designated control line 80b. The facility devices 40 to 60 include an air conditioner 40, a light 50, and a ventilating fan 60. The air conditioner 40 may be multiple air conditioners or a pair of air conditioners. In the present embodiment, one air conditioner 40, light 50, and ventilating fan 60 each are shown in each of the properties A, B in order to simplify the description, but the facility devices 40 to 60 installed in the properties A, B are not provided by way of any such limitation. The type and/or number of facility devices installed in the property A may be different from the type and/or number of facility devices installed in the property B.

The energy management apparatus 10 set up at the power company 1 and the control apparatuses 30 set up at the properties 2 are connected via the internet 80a. The energy management apparatus 10 is an apparatus whereby the power company 1 manages the amount of power consumed by the properties 2. The control apparatuses 30 are apparatuses for controlling the facility devices 40 to 60 installed in the properties 2.

The power company 1 makes contracts pertaining to demand-response control with the properties 2. Demand-response control involves control of the facility devices 40 to 60 performed by the properties 2 (the control apparatuses 30) in compliance with the demand sent from the power company 1 (the energy management apparatus 10). The demand includes, e.g., conditions pertaining to power consumption and the time span (adjustment time span) during which demand-response control is executed. Specifically, a power consumption target value (target power consumption) of kw/h during a predetermined time span (e.g., one hour starting at 11:00 am) is stipulated in the demand.

Under the contract pertaining to demand-response control (the demand-response contract), power (an amount of power) complying with the demand is consumed in the properties 2, and the power company 1 thereby pays out a predetermined incentive (e.g., a fee or a discount) to the properties 2. Specifically, the properties 2 receive a predetermined incentive when power coinciding with the target power consumption is continuously consumed during the adjustment time span defined in the demand.

Also under the demand-response contract, when power complying with the demand is not consumed in the properties 2, a predetermined penalty, such as, e.g., an additional fee or a forfeit payment, is imposed on the properties 2. Specifically, a penalty is imposed when the properties 2 do not continuously consume power coinciding with the target power consumption during the adjustment time span.

In other words, when the properties 2 uphold the demand-response contract, a predetermined incentive from the power company 1 is given, and when the properties do not comply with the demand-response contract, a predetermined penalty is imposed.

The energy management apparatus 10 and the control apparatuses 30 included in the energy management system 100 are described below.

(2) Configuration of Energy Management Apparatus

Figure 2:
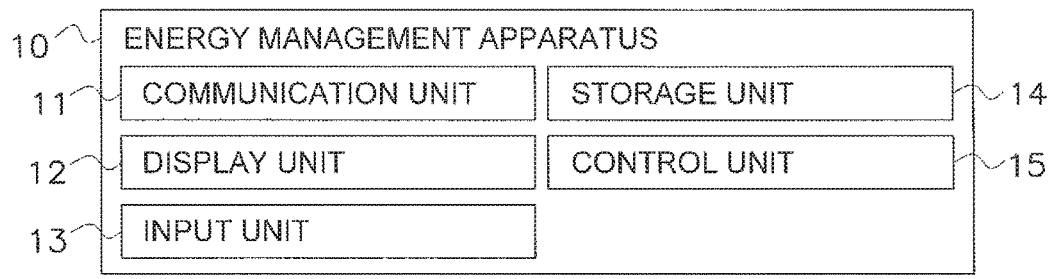
FIG. 2 is a schematic configuration view of a management apparatus according to the first embodiment.

FIG. 2 shows a schematic configuration view of the energy management apparatus 10. The energy management apparatus 10 is an apparatus for managing the amount of power consumed by the properties 2 in the power company 1, as described above. The energy management apparatus 10 comprises a communication unit 11, a display unit 12, an input unit 13, a storage unit 14, and a control unit 15.

(2-1) Communication Unit

The communication unit 11 is a network interface that enables the energy management apparatus 10 to be connected to the internet 80a.

(2-2) Display Unit

The display unit 12 is configured primarily from a display.

(2-3) Input Unit

The input unit 13 is configured primarily from operation buttons, a keyboard, a mouse, and the like.

(2-4) Storage Unit

The storage unit 14 is configured primarily from a hard disk. The demand transmitted to the properties 2 (the control apparatuses 30) is stored in the storage unit 14 for each property 2. Also stored in the storage unit 14 are various programs needed to manage the amount of power consumed by the properties 2.

(2-5) Control Unit

The control unit 15 is configured primarily from a CPU, ROM, and RAM. The control unit 15 manages the amount of power consumed by the properties 2 by reading and executing the aforementioned programs stored in the storage unit 14.

(3) Configuration of Control Apparatus

Figure 3:
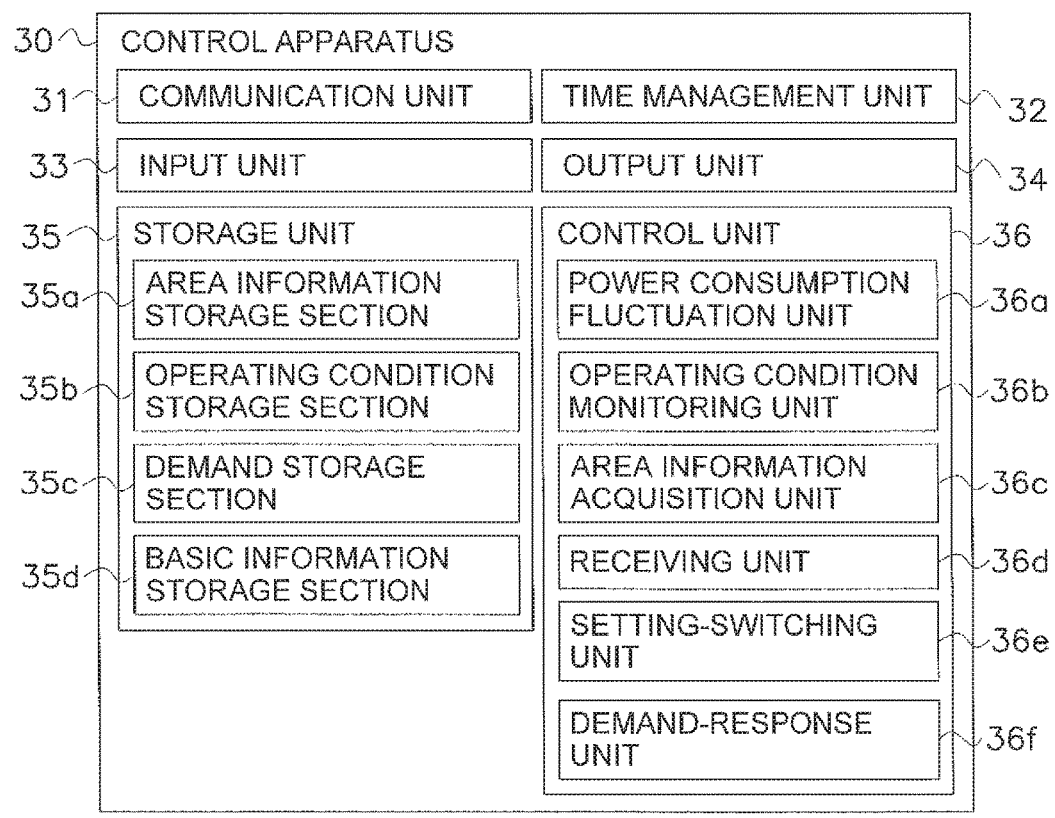
FIG. 3 is a schematic configuration view of a control apparatus according to the first embodiment.

FIG. 3 shows a schematic configuration view of a control apparatus 30. The control apparatuses 30 are apparatuses for controlling the facility devices 40 to 60 installed in the properties 2, as described above. The control apparatus 30 comprises a communication unit 31, a time management unit 32, an input unit 33, an output unit 34, a storage unit 35, and a control unit 36.

(3-1) Communication Unit

The communication unit 31 is a network interface that enables the control apparatus 30 to connect to the internet 80a. Two-way communication between the control apparatus 30 and the energy management apparatus 10 is conducted by the communication unit 31 via the internet 80a. The communication unit 31 is also an interface that enables the control apparatus 30 to connect to the designated control line 80b.

(3-2) Time Management Unit

The time management unit 32 includes a timer that approximately synchronizes with the energy management apparatus 10 set up in the power company 1. The time management unit 32 performs time management of the various controls executed by the control apparatus 30.

(3-3) Input Unit

The input unit 33 is configured primarily from a touch panel covering the operation buttons and the display which is described hereinafter. Various commands from the user to the facility devices 40 to 60, such as signals for starting and stopping the facility devices 40 to 60, changes to the settings, and changes to the operating mode, are inputted to the input unit 33.

(3-4) Output Unit

The output unit 34 is configured primarily from a display. A screen showing the operating conditions of the facility devices 40 to 60 is displayed on the output unit 34. The operating conditions herein include, for example, the ON/OFF states of the facility devices 40 to 60, the operating modes (air-cooling mode/air-heating mode), intake temperature, set temperature, illuminance, ventilation amount, running time, running rate, operating capability (%) during running, and the like.

The output unit 34 outputs the current power consumption and the specifics of the demand to the display. The current power consumption includes the power consumption of each of the facility devices 40 to 60, and the total power consumption which is the total power consumption of all the facility devices 40 to 60 together. Furthermore, the output unit 34 also outputs to the display various information stored in the storage unit 35, the results of the various programs executed by the control unit 36, and the like.

(3-5) Storage Unit

The storage unit 35 is configured primarily from a hard disk. The storage unit 35 stores programs that can be read and executed by the control unit 36, described hereinafter. The storage unit 35 includes an area information storage section 35a, an operating condition storage section 35b, a demand storage section 35c, and a basic information storage section 35d.

(3-5-1) Area Information Storage Section

The area information storage section 35a stores information on the each space in the property 2 (area information). The area information includes information on human presence/absence. Specifically, the area information storage section 35a stores detection results from a human detection sensor. The area information is acquired by an area information acquisition unit 36c, described hereinafter. The area information storage section 35a associates and stores a human detection sensor set up in each space of the property 2 and information (presence/absence) obtained by the human detection sensor.

(3-5-2) Operating Condition Storage Section

The operating condition storage section 35b stores information pertaining to operating conditions monitored by an operating condition monitoring unit 36b, described hereinafter. The information pertaining to operating conditions includes information pertaining to the ON/OFF states of the facility devices 40 to 60, the operating modes (air-cooling mode/air-heating mode), intake temperature, set temperature, illuminance, ventilation amount, running time, running rate, operating capability (%) during running, and the like, as described above.

The information pertaining to operating conditions also includes information pertaining to the power consumption measured by the power meter 7.

(3-5-3) Demand Storage Section

The demand storage section 35c stores the demand sent from the energy management apparatus 10. Specifically, the demand storage section 35c stores the time span during which power consumption is adjusted (the adjustment time span) and the target power consumption tw.

Specifically, information pertaining to the starting time and ending time of the adjustment time span is stored as the adjustment time span. The target power consumption tw is the power (amount) that can be consumed per unit time, or the power (amount) that should be consumed per unit time. The target power consumption tw is a value allowed to have deviation, with one specific value as a basis. In other words, the range of power (amount) that can be consumed or that should be consumed is stipulated as the target power consumption tw in the demand. Specifically, in demand-response control, the facility devices 40 to 60 are controlled so that the consumed power reaches a value within the range stipulated as the target power consumption tw during the time span stipulated in the demand.

(3-5-4) Basic Information Storage Section

The basic information storage section 35d stores basic information on the facility devices 40 to 60 installed in the property 2. Basic information herein includes the type and number of facility devices 40 to 60 installed in the property 2, the power consumption per unit time in accordance with the operating capability of each of the facility devices 40 to 60, and the like.

The basic information also includes association information whereby the space in the property 2 is associated with the human detection sensor and the facility devices 40 to 60 installed in the space.

The basic information may also include priority order pertaining to the facility devices 40 to 60. Priority order herein is the order of the facility devices 40 to 60 for which the operating state prior to demand-response control is to be maintained when demand-response control is executed.

(3-6) Control Unit

The control unit 36 is configured primarily from a CPU, ROM, and RAM. By reading and executing the aforementioned programs stored in the storage unit 35, the control unit 36 functions primarily as a power consumption fluctuation unit 36a, an operating condition monitoring unit (confirmation unit) 36b, an area information acquisition unit 36c, a receiving unit 36d, a setting-switching unit 36e, and a demand-response unit 36f, as shown in FIG. 3.

(3-6-1) Power Consumption Fluctuation Unit

The power consumption fluctuation unit 36a executes control for increasing or reducing the power consumption of the facility devices 40 to 60 (non-demand-response control), regardless of the demand. Non-demand-response control includes controls such as energy conservation control, schedule control, and manual control.

Energy conservation control is control based on the aforementioned information stored in the area information storage section 35a. Specifically, energy conservation control is control based on human presence/absence in the spaces in the property 2. In energy conservation control, for example, the facility devices 40 to 60 are set to OFF in spaces where the human detection sensors detect absence. The timing herein at which the facility devices are set to OFF can be set as desired.

Schedule control is control of the facility devices 40 to 60 that follows a schedule. The schedule is a plan pertaining to the timing of setting the facility devices 40 to 60 to ON/OFF, and/or the operation specifics (set temperature, airflow quantity, illuminance, etc.) when the facility devices 40 to 60 are set to ON. In the schedule, the facility devices 40 to 60 are controlled on the basis of a schedule in which a twenty-four-hour block is divided into any number of time spans and the control specifics in each time span have been established in advance. The schedule is stored in the storage unit 35.

Furthermore, manual control means that the facility devices 40 to 60 are controlled according to user preferences.

The power consumption fluctuation unit 36a increases or reduces the power consumption of the facility devices 40 to 60 on the basis of a command inputted to the input unit 33, a command generated by the operating condition monitoring unit 36b, and a command based on the schedule.

The power consumption fluctuation unit 36a controls the facility devices 40 to 60 on the basis of various commands only when a change reception setting is set to active by the setting-switching unit 36e which is described hereinafter. Specifically, when the change reception setting is set to inactive by the setting-switching unit 36e, non-demand-response control is not executed.

(3-6-2) Operating Condition Monitoring Unit

The operating condition monitoring unit 36b monitors the operating conditions of the facility devices 40 to 60. The operating conditions of the facility devices 40 to 60 include information relating to, for example, the ON/OFF states of the facility devices 40 to 60, the operating modes (air-cooling mode/air-heating mode), intake temperature, set temperature, illuminance, ventilation amount, running time, running rate, operating capability (%) during running, and the like, as described above. The information pertaining to operating conditions also includes information pertaining to the power consumption measured by the power meter 7. The operating capability (%) herein means how great of a capability the air conditioner 40 is actuating, relative to the rated capability of the air conditioner 40.

The operating condition monitoring unit 36b receives the time submitted by the time management unit 32, communicates with the facility devices 40 to 60 and the power meter 7 at predetermined time intervals to monitor the operating conditions, and acquires various information. The operating condition monitoring unit 36b monitors the operating conditions of the facility devices 40 to 60 at predetermined time intervals even after the start of demand-response control. The various information acquired by the operating condition monitoring unit 36b is stored in the aforementioned operating condition storage section 35b along with the date and time the information was acquired.

When the demand is received by the receiving unit 36d described hereinafter, the operating condition monitoring unit 36b monitors the operating conditions of the facility devices 40 to 60 and the obtained information is stored in the operating condition storage section 35b, regardless of the predetermined time intervals. Specifically, the operating condition monitoring unit 36b monitors the operating conditions of the facility devices 40 to 60 immediately before the start of demand-response control and acquires the information of the facility devices 40 to 60 at the timing at which the demand was received.

The operating condition monitoring unit 36b confirms whether or not energy conservation control needs to be executed. Specifically, the operating condition monitoring unit 36b confirms whether or not energy conservation control needs to be executed on the basis of the information stored in the area information storage section 35a and the information stored in the operating condition storage section 35b. More specifically, the operating condition monitoring unit 36b confirms whether or not there are any number of facility devices 40 to 60 in spaces where an absence is detected by the human detection sensors, and whether or not these facility devices 40 to 60 are being driven. Upon confirming there are facility devices 40 to 60 being driven in spaces where no humans are present, the operating condition monitoring unit 36b generates a command to stop these facility devices 40 to 60 and delivers this command to the power consumption fluctuation unit 36a.

(3-6-3) Area Information Acquisition Unit

The area information acquisition unit 36c acquires the information detected by the human detection sensors at a predetermined timing. Specifically, when a new state is detected by a human detection sensor, the area information acquisition unit 36c acquires information indicating this from the human detection sensor. The area information acquisition unit 36c stores the acquired information in the aforementioned area information storage section 35a. The area information acquisition unit 36c continuously acquires information at a predetermined timing even during demand-response control.

(3-6-4) Receiving Unit

The receiving unit 36d receives the demand sent from the energy management apparatus 10. The demand received by the receiving unit 36d is stored in the aforementioned demand storage section 35c.

(3-6-5) Setting-Switching Unit

The setting-switching unit 36e switches a setting relating to the receiving of non-demand-response control (change reception setting) to active/inactive. Specifically, when the demand is received by the receiving unit 36d, the setting-switching unit 36e switches the change reception setting to inactive. Specifically, the setting-switching unit 36e sets the change reception setting to inactive at the starting time of the adjustment time span.

At this time, the setting-switching unit 36e generates a command for each unit so that no commands relating to non-demand-response control are received. For example, the setting-switching unit 36e generates a command so that no inputs whatsoever are received by the input unit 33, or generates a command so that automatic control is not received by the power consumption fluctuation unit 36a. Automatic control herein includes energy conservation control and schedule control.

Furthermore, when the ending time of the adjustment time span is reached, the setting-switching unit 36e switches the change reception setting to active.

(3-6-6) Demand-Response Unit

The demand-response unit 36f executes demand-response control. Demand-response control is control for adjusting the power consumption of the facility devices 40 to 60 on the basis of the demand. In other words, the demand-response unit 36f controls the facility devices 40 to 60 so as to satisfy the conditions stipulated by the demand.

Specifically, the demand-response unit 36f starts demand-response control when the time stipulated by the demand (the starting time of the adjustment time span) is reached. In demand-response control, the facility devices 40 to 60 are controlled so that the total amount of power consumption per unit time of the facility devices 40 to 60 installed in the property 2 coincides with the target power consumption tw stipulated by the demand.

In demand-response control, which of the facility devices 40 to 60 to actuate and at which magnitude of an operating capability to actuate the facility devices 40 to 60 may be decided in any manner. For example, the operating capability of the driven air conditioner 40 may be lowered uniformly, and facility devices may be stopped which have a lower priority order on the basis of the priority order established in advance for the facility devices 40 to 60.

(4) Flow of Process in Control Apparatus

Figure 4:
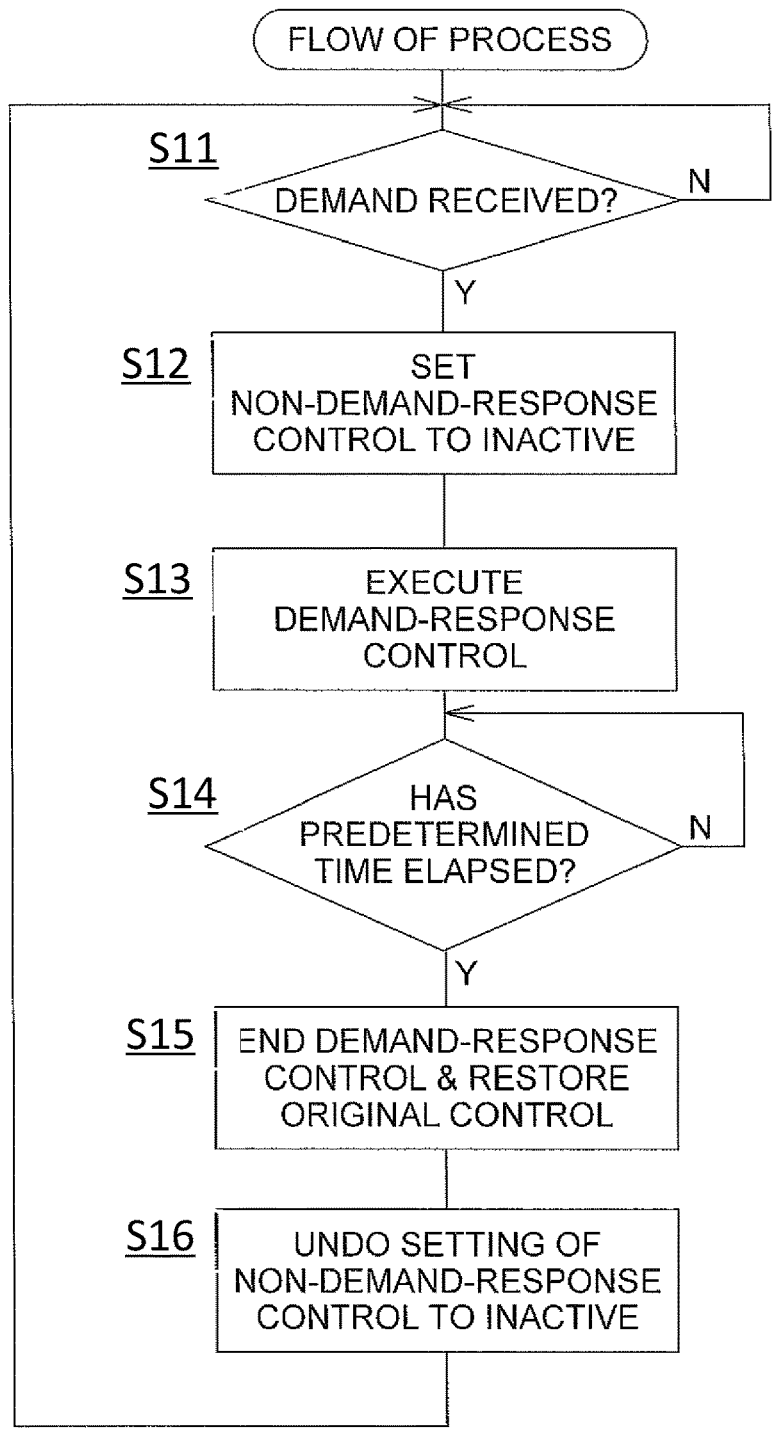
FIG. 4 is a diagram showing the flow of the process of the control apparatus according to the first embodiment.

Next, FIG. 4 is used to describe the flow of the process relating to the demand in the control apparatus 30. The control apparatus 30 executes non-demand-response control until a demand is received. Specifically, the control apparatus 30 executes energy conservation control, schedule control, and manual control as appropriate until demand-response control is started.

First, in step S11, an assessment is made as to whether or not a demand has been received by the receiving unit 36d. In step S11, the system waits until a demand is received, and after a demand is received, the demand is stored in the demand storage section 35c and the process advances to step S12.

In step S12, the change reception setting is switched to inactive by the setting-switching unit 36e. A command is thereby generated so that no inputs whatsoever are received by the input unit 33, and a command is generated so that automatic control is not received by the power consumption fluctuation unit 36a. Specifically, in step S12, a setting is made so that no commands for non-demand-response control are received in the adjustment time span. The setting is switched by the setting-switching unit 36e at the starting time of the adjustment time span. The process then advances to step S13.

In step S13, demand-response control is executed by the demand-response unit 36f. The demand-response unit 36f controls the facility devices 40 to 60 on the basis of the demand stored in the demand storage section 35c. Specifically, the demand-response unit 36f controls the facility devices 40 to 60 so that in the time span stipulated by the demand, the total amount of power consumption of the facility devices 40 to 60 in the property 2 coincides with the target power consumption tw stipulated by the demand. The process then advances to step S14.

In step S14, a determination is made as to whether or not a predetermined time duration has elapsed, on the basis of the information obtained from the time management unit 32. In other words, in step S14, a determination is made as to whether or not the ending time of the adjustment time period has arrived. In step S14, the system waits until the predetermined time duration has elapsed, and when the predetermined time duration has elapsed, the process advances to step S15.

In step S15, demand-response control is ended, and the control immediately prior to the start of demand-response control is restored in the facility devices 40 to 60 on the basis of the information stored in the operating condition storage section 35b. The process then advances to step S16.

In step S16, the change reception setting is switched to active by the setting-switching unit 36e. Specifically, inputs can be received by the input unit 33, and the power consumption fluctuation unit 36a executes manual control as appropriate. Specifically, in step S16, a setting is made so that commands for non-demand-response control are received. The process then returns to step S11.

(5) Characteristics
(5-1)

The control apparatus 30 according to the above embodiment comprises the receiving unit 36d, the demand-response unit 36f, the power consumption fluctuation unit 36a, and the setting-switching unit (setting unit) 36e. The receiving unit 36d receives a demand pertaining to power consumption sent from the energy management apparatus 10. When the demand is received by the receiving unit 36d, the demand-response unit 36f executes demand-response control. Demand-response control is control for adjusting the power consumption of facility devices located on a property, in response to a demand. The power consumption fluctuation unit 36a executes non-demand-response control. Non-demand-response control is control for increasing or reducing the power consumption of the facility devices, regardless of the demand. The setting-switching unit 36e sets non-demand-response control to active or inactive. The facility devices can thereby be effectively controlled under demand-response control.

The energy management system 100 according to the above embodiment is a system constructed between the power company 1 and the properties 2 to which power is supplied from the power company 1. In the energy management system 100, the energy management apparatus 10 installed in the power company 1 and the control apparatuses 30 installed in the properties 2 are connected via the internet 80a, and are configured so that information can be transferred.

The control apparatuses 30 in the properties 2 are used to control the facility devices 40 to 60 installed in the properties 2. The control apparatuses 30 execute control of the facility devices 40 to 60 (non-demand-response control) on the basis of the presence/absence of humans, and/or a schedule or the like set by the user. The energy management system 100 is configured such that information is periodically transmitted from the control apparatuses 30 to the energy management apparatus 10. The power company 1 ascertains the total amount of power consumed in all of the managed properties 2, 2, on the basis of the information periodically sent from the control apparatuses 30 set up in the properties 2.

In the energy management system 100, a demand-response contract is made by the power company 1 and the properties 2 as described above. The demand-response contract is a contract promising that due to demand-compliant control (demand-response control) being consistent in the properties 2, a predetermined incentive (e.g., a fee or a discount) will be paid out from the power company 1 to the properties 2. Under the demand-response contract, when demand-compliant control could not be consistent in the properties 2, the properties 2 are subjected to, e.g., an additional fee, a forfeit payment, or another penalty. The demand is a request to control the facility devices 40 to 60 on the basis of predetermined conditions, and in the above embodiment, the predetermined conditions include the target power consumption tw and a time span (adjustment time span) for driving the facility devices 40 to 60 in the range of the target power consumption tw. Due to the properties 2 controlling the facility devices 40 to 60 in compliance with the demand-response contract, the power company 1 can adjust the total amount of power consumed by the energy management system 100 overall.

The facility devices 40 to 60 in the properties 2 can be controlled regardless of the demand sent from the power company 1 in order to create a comfortable environment in the spaces in the properties 2. Specifically, the control apparatus 30 executes control (non-demand-response control) of the facility devices 40 to 60 according to the needs of the properties 2. During the adjustment time span, the control apparatuses 30 control the facility devices 40 to 60 in compliance with the demand in order to uphold the demand-response contract in the properties 2.

Figure 5:
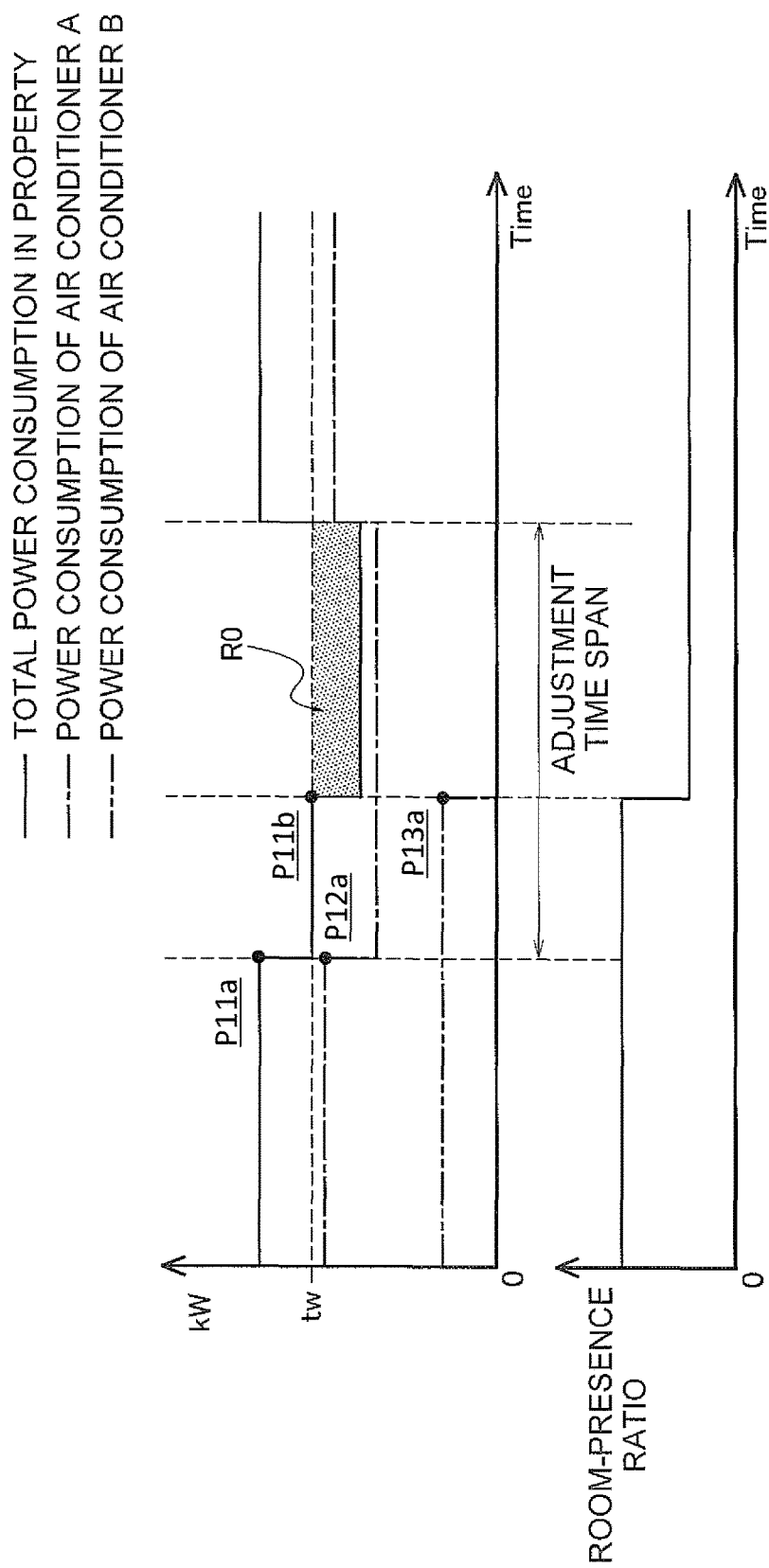
FIG. 5 is a diagram showing fluctuations in power consumption when no setting switch is performed by a setting-switching unit.
Figure 6:
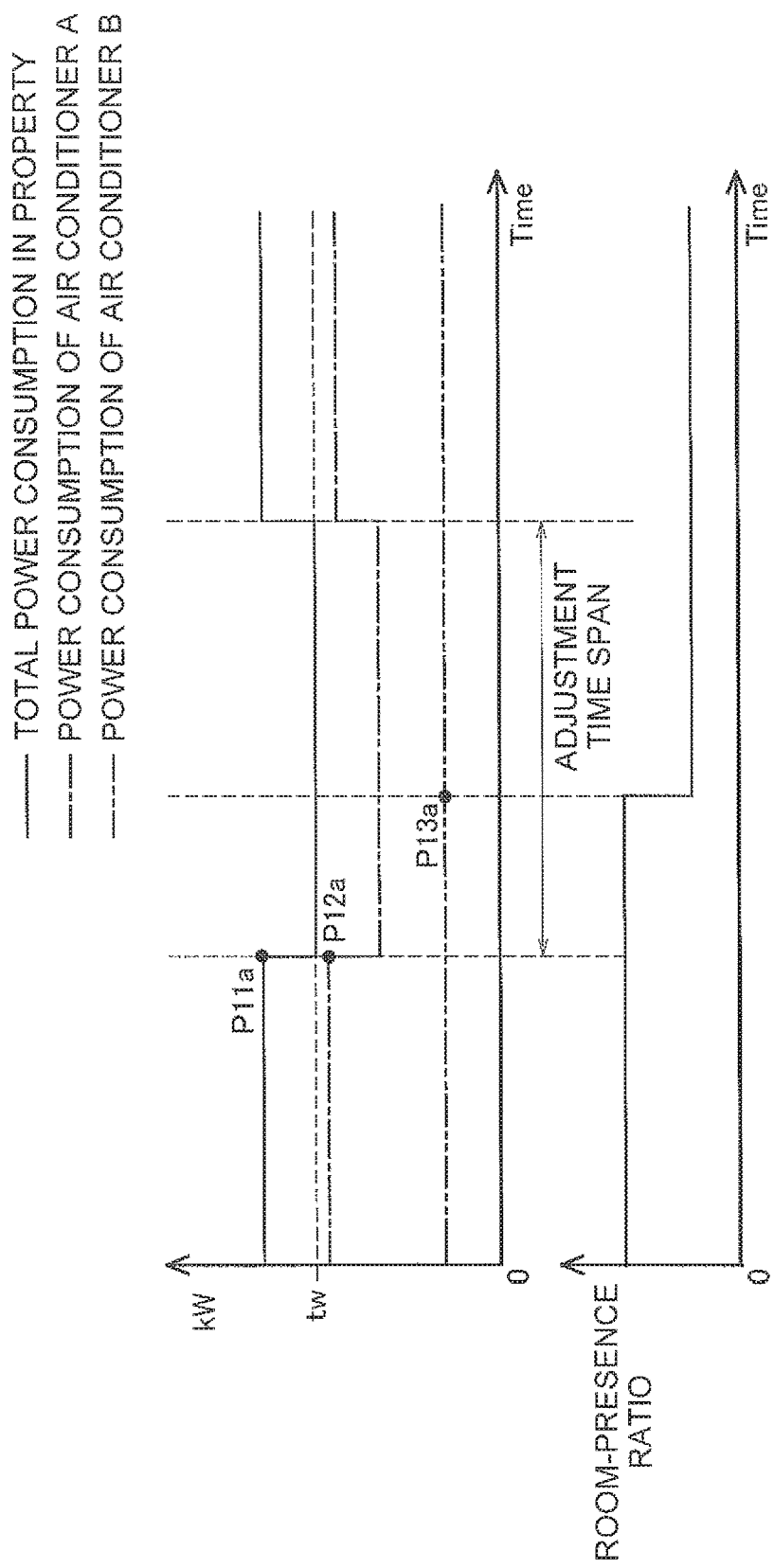
FIG. 6 is a diagram illustrating the processes of the control apparatus according to the first embodiment.

When non-demand-response control is executed in the properties 2 during demand-response control, cases arise in which the conditions of the target power consumption stipulated by the demand cannot be met. For example, cases arise in which the state of the space (the state of presence/absence) in a property 2 changes during the adjustment time span, as shown in FIG. 5. For example, in this case, the property 2 includes spaces A, B; an air conditioner A being set up in space A, and an air conditioner B being set up in space B. When the adjustment time span starts, the operating capability of the air conditioner A is lowered (refer to point P12a), and the operating capability of the air conditioner B is maintained. The total of the power consumption in the property 2 is thereby reduced from the value indicated at point P11a toward the target power consumption tw.

When, for example, the state of space B changes from a presence state to an absence state during the adjustment time span, the air conditioner B set up in space B is stopped (refer to point P13a, non-demand-response control). The total of the power consumption in the property 2 and the target power consumption tw would then cease to coincide (refer to point P11b). In other words, in the graph in FIG. 5, the power consumption in the colored portion (section R0) would fall short of the target power consumption tw. As a result, the property 2 would no longer be able to achieve the incentive.

However, the control apparatus 30 according to the above embodiment is designed such that the change reception setting can be switched to active/inactive by the setting-switching unit (setting unit) 36e. Specifically, in the control apparatus 30, when a demand is received from the energy management apparatus 10, demand-response control is executed by the demand-response unit 36f. The control (non-demand-response control) for increasing or reducing the power consumption of the facility devices using the setting-switching unit 36e, regardless of the demand, can be set to active or inactive. When the change reception setting is switched to inactive, the state changes to one in which no commands pertaining to non-demand-response control are received, and a switch is made to a state in which non-demand-response control cannot be executed. As a result, no non-demand-response control is received during the adjustment time span, and control specifics can be maintained constant (refer to FIG. 6). Specifically, non-demand-response control can be switched between active and inactive as appropriate, and therefore the facility devices 40 to 60 can be effectively controlled under demand-response control. Additionally, the property 2 can reliably receive the incentive.

(5-2)

In the control apparatus 30 according to the above embodiment, the setting-switching unit (setting unit) 36e sets non-demand-response control to inactive after the demand is received. The power consumption adjusted so as to coincide with the target power consumption is thereby unaffected by other control (non-demand-response control) due to demand-response control. The target power consumption can be maintained during the adjustment time span, and therefore reductions in the incentive can be avoided.

(5-3)

In the control apparatus 30 according to the above embodiment, the control apparatus 30 further comprises an operating condition monitoring unit (confirmation unit) 36b. The operating condition monitoring unit 36b confirms whether or not non-demand-response control needs to be executed after demand-response control by the demand-response unit 36f is ended. When it is assessed that non-demand-response control needs to be executed, the operating condition monitoring unit 36b generates a command pertaining to non-demand-response control and delivers this command to the power consumption fluctuation unit 36a. The power consumption fluctuation unit 36a executes non-demand-response control on the basis of the command delivered by the operating condition monitoring unit 36b.

Figure 7:
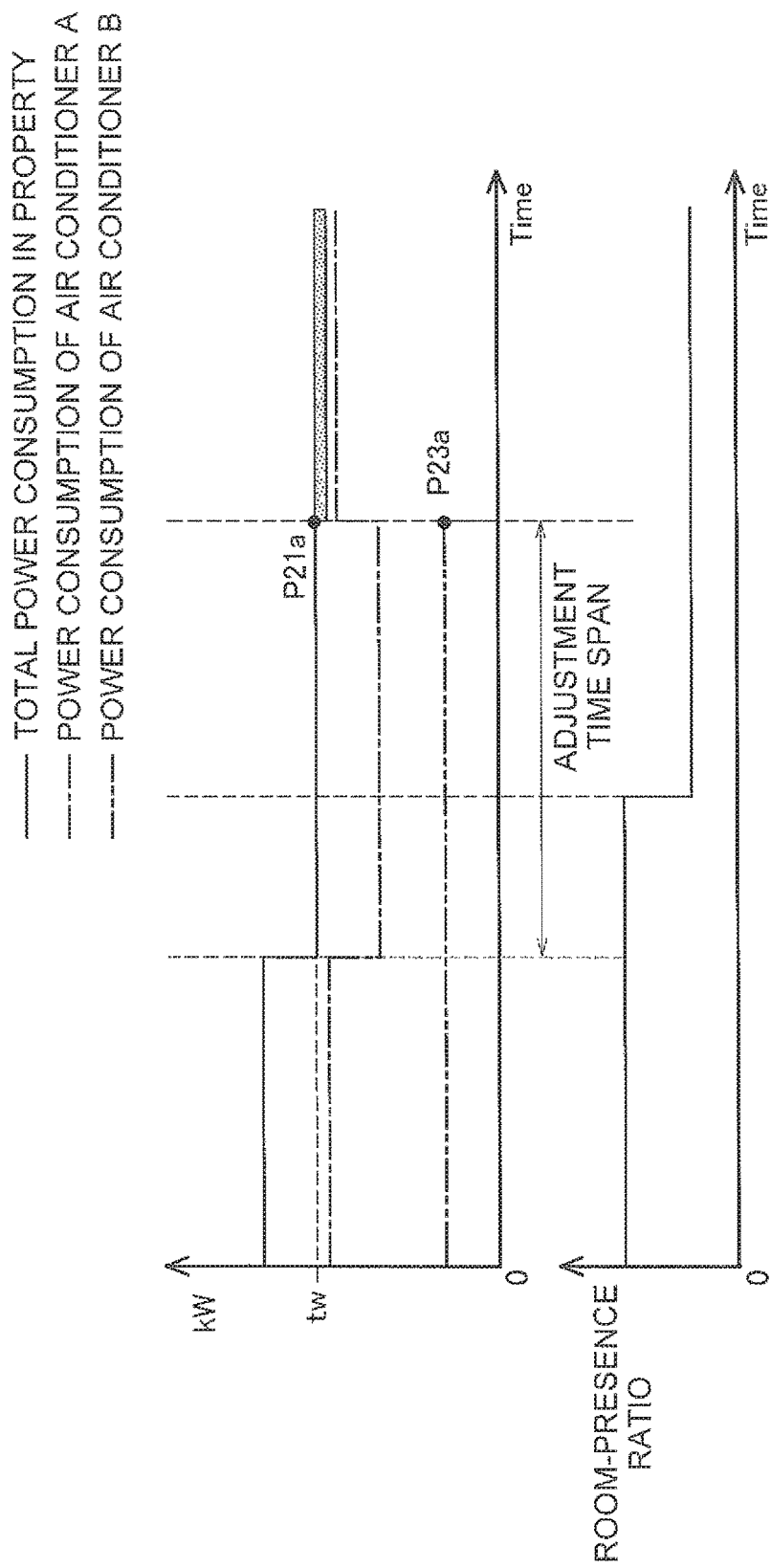
FIG. 7 is a diagram illustrating the processes of the control apparatus according to the first embodiment.
Figure 8:
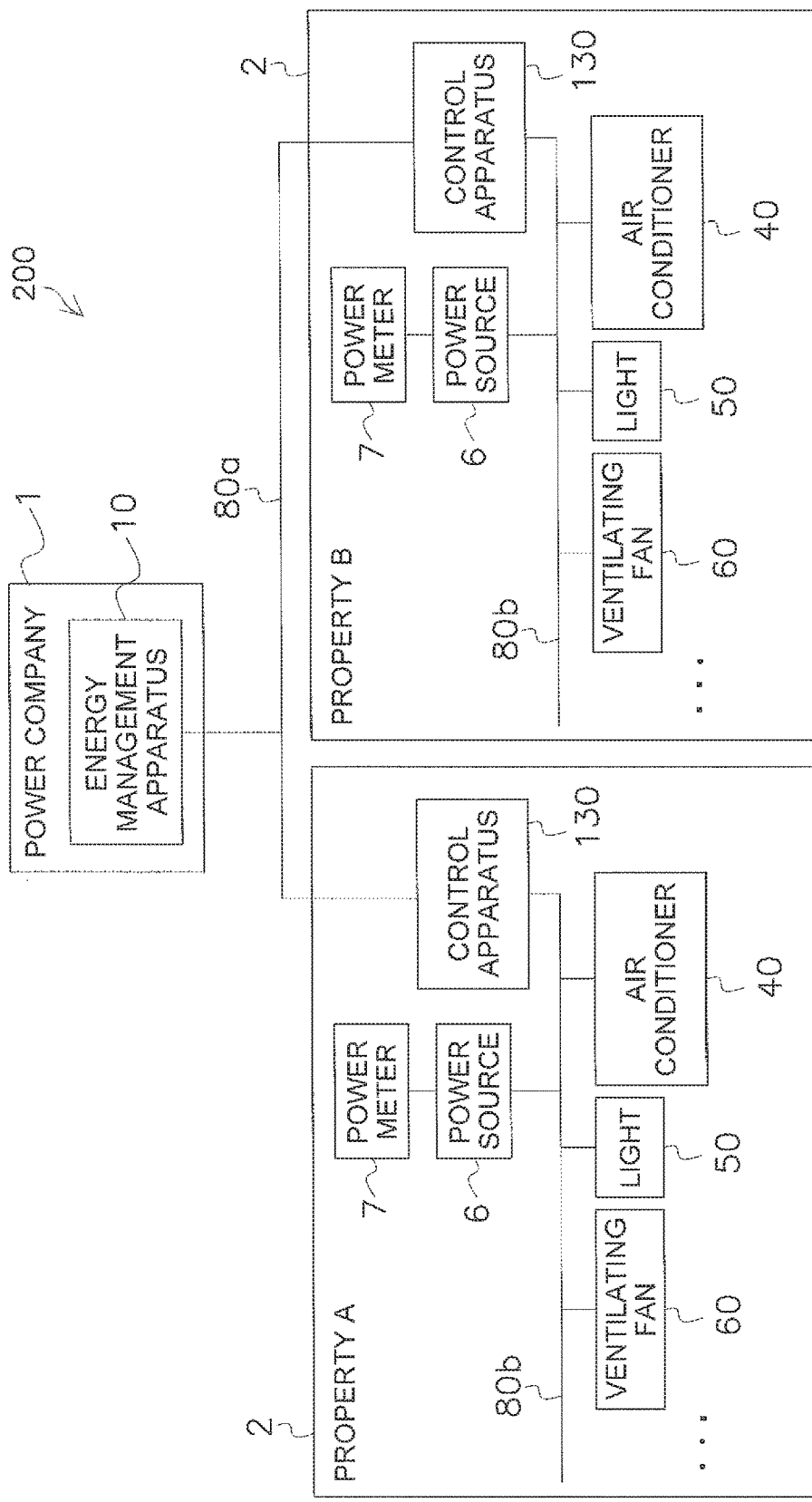
FIG. 8 is a schematic configuration view of an entire system according to a second embodiment.

FIG. 7 is used to give a description. For example, the state of space B in which the air conditioner B is set up changes during the adjustment time span. In this case, the air conditioner B would be stopped after the end of the adjustment time span (refer to point P23a). The total power consumption in the property 2 would thereby be reduced soon after the end of the adjustment time span (refer to point P21a). As a result, the power in the colored portion in FIG. 7 can be reduced.

Thus, in the control apparatus 30 according to the above embodiment, energy conservation control can be started immediately after the end of the adjustment time span when the state of the space in the property 2 changes, during the adjustment time span, to a state in which energy conservation control can be executed. Specifically, the facility devices 40 to 60 can be controlled under desired conditions soon after the end of the adjustment time span.

(5-4)

In the control apparatus 30 according to the above embodiment, at least one of energy conservation control, schedule control, and manual control is executed as non-demand-response control. Energy conservation control is control based on human presence/absence in the spaces in which the facility devices are set up. The facility devices 40 to 60 can thereby be controlled in a manner suited to the situation of the properties 2.

(6) Modifications (6-1) Modification 1A

In the control apparatus 30 according to the above embodiment, in order to prevent non-demand-response control from being executed during the adjustment time span, a configuration is adopted such that no commands relating to non-demand-response control are received from the starting time to the ending time of the demand-response control.

The control apparatus 30 herein may be changed to a configuration in which receiving of commands is not executed when the setting-switching unit 36e sets non-demand-response control to inactive, instead of a configuration in which commands are not received in such a case. In other words, a configuration may be adopted such that commands relating to non-demand-response control are received during the adjustment time span but are disregarded.

Specifically, when the demand is received by the receiving unit 36d, a setting relating to the receiving of non-demand-response control is switched to inactive. A configuration may then be adopted in which commands relating to non-demand-response control are received, but are disregarded until the ending time of the demand-response control, and then are executed after the ending time of the demand-response control is reached and the change reception setting is switched to active.

Desired control can thereby be executed as appropriate without affecting the power consumption during the adjustment time span.

(6-2) Modification 1B

In the energy management system 100 as described in the above embodiment, a demand is sent from the energy management apparatus 10 to the control apparatuses 30.

The demand herein may be created on the basis of multiple pieces of suppression possibility information presented to the power company 1 by the properties 2. The suppression possibility information, which is information pertaining to the amount of power that can be suppressed in the properties 2, includes an energy suppression possibility amount and the length of time that the energy suppression possibility amount can be continued (the length of a suppression possibility time). Specifically, the suppression possibility information is information for requesting that it be possible to suppress the total amount of power consumed in the properties 2. In the power company 1, the energy management apparatus 10 selects the preferred suppression possibility information as a combination of the power consumption of all the properties being managed from the multiple pieces of suppression possibility information sent from the control apparatuses 30 of the properties 2, and the energy management apparatus creates a demand to send to the properties 2 on the basis of the selected suppression possibility information.

In the energy management apparatus 10, the power amount that had been planned is thereby consumed in the properties 2, and energy can therefore be managed in a suitable manner throughout the entire energy management system 100.

(6-3) Modification 1C

In the above embodiment, non-demand-response control includes energy conservation control, schedule control, manual control, and the like. Energy conservation control is control based on the presence/absence of humans in the spaces in which the facility devices are set up. Energy conservation control may include control based on external factors. Control based on external factors means control for changing the operation specifics (set temperature, airflow quantity, illuminance, etc.) of the facility devices 40 to 60 on the basis of, e.g., how great or small is the amount of solar radiation in the spaces in the property 2.

In this case, apparatuses for measuring the amount of solar radiation would be set up in the spaces included in the property 2, and information pertaining to the amount of solar radiation would be stored in the area information storage section 35a. The set capabilities and/or operating states of the facility devices 40 to 60 according to the amount of solar radiation would be stored in the basic information storage section 35d.

It would thereby be possible to improve the energy conservation effect by controlling the facility devices 40 to 60 in a manner suited to spaces having a greater amount of solar radiation and spaces having a lesser amount of solar radiation.

<Second Embodiment>

An energy management system 200 according to a second embodiment is described below with reference to FIGS. 8-12. The configuration of the energy management system 200 according to the second embodiment is the same as that of the energy management system 100 according to the first embodiment, except for the configuration of the control apparatus 130. Specifically, the overall configuration of the energy management system 200 is the same as the overall configuration of the energy management system 100, but the control apparatus 30 according to the first embodiment is replaced by the control apparatus 130 (refer to FIG. 8). The configurations of the energy management apparatus 10 set up in the power company 1, the facility devices 40 to 60 set up in the properties 2, the power source 6, and the power meter 7 are similarly the same as the configurations of the energy management apparatus 10, the facility devices 40 to 60 set up in the properties 2, the power source 6, and the power meter 7 according to the first embodiment.

Therefore, no description is given below with respect to the overall configuration of the energy management system 200, or the configurations of the energy management apparatus 10, the facility devices 40 to 60 set up in the properties 2, the power source 6, and the power meter 7, but the configuration of the control apparatus 130 is described in detail.

(1) Configuration of Control Apparatus

Figure 9:
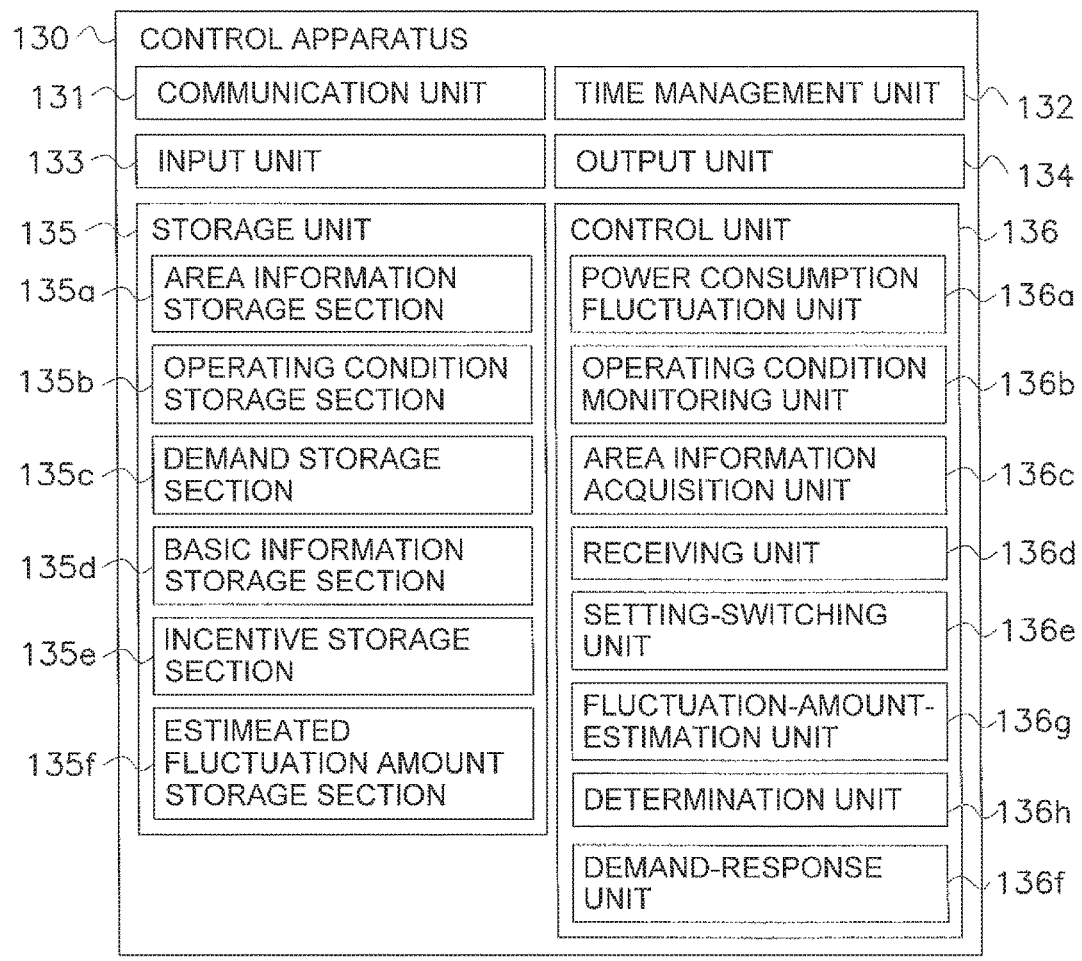
FIG. 9 is a schematic configuration view of a control apparatus according to the second embodiment.

FIG. 9 shows a schematic configuration view of a control apparatus 130. The control apparatuses 130 are apparatuses for controlling the facility devices 40 to 60 installed in the properties 2. Each control apparatus 130 comprises a communication unit 131, a time management unit 132, an input unit 133, an output unit 134, a storage unit 135, and a control unit 136.

(1-1) Communication Unit

The communication unit 131 is a network interface that enables the control apparatus 130 to connect to the internet 80a. Two-way communication between the control apparatus 130 and the energy management apparatus 10 is conducted by the communication unit 131 via the internet 80a.

The communication unit 131 is also an interface that enables the control apparatus 130 to connect to the designated control line 80b.

(1-2) Time Management Unit

The time management unit 132 includes a timer that approximately synchronizes with the energy management apparatus 10 set up in the power company 1. The time management unit 132 performs time management of the various controls executed by the control apparatus 130.

(1-3) Input Unit

The input unit 133 is configured primarily from a touch panel covering the operation buttons and the display which is described hereinafter. Various commands from the user to the facility devices 40 to 60, such as signals for starting and stopping the facility devices 40 to 60, changes to the settings, and changes to the operating mode, are inputted to the input unit 133.

(1-4) Output Unit

The output unit 134 is configured primarily from a display. A screen showing the operating conditions of the facility devices 40 to 60 is displayed on the output unit 134. The operating conditions herein include, for example, the ON/OFF states of the facility devices 40 to 60, the operating modes (air-cooling mode/air-heating mode), intake temperature, set temperature, illuminance, ventilation amount, running time, running rate, operating capability (%) during running, and the like.

The output unit 134 outputs the current power consumption and the specifics of the demand to the display. The current power consumption includes the power consumption of each of the facility devices 40 to 60, and the total power consumption which is the total power consumption of all the facility devices 40 to 60 together. Furthermore, the output unit 134 also outputs to the display various information stored in the storage unit 135, the results of the various programs executed by the control unit 136, and the like.

(1-5) Storage Unit

The storage unit 135 is configured primarily from a hard disk. The storage unit 135 stores programs that can be read and executed by the control unit 136, described hereinafter. The storage unit 135 includes an area information storage section 135a, an operating condition storage section 135b, a demand storage section 135c, a basic information storage section 135d, an incentive storage section 135e, and a estimated fluctuation amount storage section 135f.

(1-5-1) Area Information Storage Section

The area information storage section 135a stores information on the spaces in the property 2 (area information). The area information includes information on human presence/absence. Specifically, the area information storage section 135a stores detection results from a human detection sensor. The area information is acquired by an area information acquisition unit 136c, described hereinafter. The area information storage section 135a associates and stores a human detection sensor set up in each space of the property 2 and information (presence/absence) obtained by the human detection sensor.

(1-5-2) Operating Condition Storage Section

The operating condition storage section 135b stores information pertaining to operating conditions monitored by an operating condition monitoring unit 136b, described hereinafter. The information pertaining to operating conditions includes information pertaining to the ON/OFF states of the facility devices 40 to 60, the operating modes (air-cooling mode/air-heating mode), intake temperature, set temperature, illuminance, ventilation amount, running time, running rate, operating capability (%) during running, and the like, as described above.

The information pertaining to operating conditions also includes information pertaining to the power consumption measured by the power meter 7.

(1-5-3) Demand Storage Section

The demand storage section 135c stores the demand sent from the energy management apparatus 10. Specifically, the demand storage section 135c stores the time span during which power consumption is adjusted (the adjustment time span) and the target power consumption tw.

Specifically, information pertaining to the starting time and ending time of the adjustment time span is stored as the adjustment time span. The target power consumption tw is the power (amount) that can be consumed per unit time, or the power (amount) that should be consumed per unit time. The target power consumption tw is a value allowed to have deviation, with one specific value as a reference. In other words, the range of power (amount) that can be consumed or that should be consumed is stipulated as the target power consumption tw in the demand. Specifically, in demand-response control, the facility devices 40 to 60 are controlled so that the consumed power reaches a value within the range stipulated as the target power consumption tw during the time span stipulated in the demand.

(1-5-4) Basic Information Storage Section

The basic information storage section 135d stores basic information on the facility devices 40 to 60 installed in the property 2. Basic information herein includes the type and number of facility devices 40 to 60 installed in the property 2, the power consumption per unit time in accordance with the operating capability of each of the facility devices 40 to 60, and the like.

The basic information also includes association information whereby the space in the property 2 is associated with the human detection sensor and the facility devices 40 to 60 installed in the space.

The basic information may also include priority order pertaining to the facility devices 40 to 60. Priority order herein is the order of the facility devices 40 to 60 for which the operating state prior to demand-response control is to be maintained when demand-response control is executed.

(1-5-5) Incentive Storage Section

The incentive storage section 135e stores information relating to an incentive received due to the demand-response contract. The information relating to an incentive is a price P1 received due to the incentive. Specifically, the price P1 received when the power consumption of the facility devices 40 to 60 can be maintained at the target power consumption during the adjustment time span is stored in the incentive storage section 135e.

(1-5-6) Estimated Fluctuation Amount Storage Section

The estimated fluctuation amount storage section 135f stores an amount of fluctuation (estimated fluctuation amount) of the power consumption as estimated by a fluctuation-amount-estimation unit 136g which is described hereinafter, and a price P2 corresponding to the estimated fluctuation amount.

The estimated fluctuation amount is an estimated value of the power consumption when non-demand-response control is executed, which varies with respect to the power consumption before non-demand-response control is executed. In other words, the estimated fluctuation amount is the difference between the power consumption per unit time before non-demand-response control is executed, and the power consumption per unit time after non-demand-response is executed.

The price P2 corresponding to the estimated fluctuation amount is the fee that is needed or received when the power amount is increased or reduced, according to the estimated fluctuation amount, with respect to the target power consumption.

(1-6) Control Unit

The control unit 136 is configured primarily from a CPU, ROM, and RAM. By reading and executing the aforementioned programs stored in the storage unit 135, the control unit 136 functions primarily as a power consumption fluctuation unit 136a, an operating condition monitoring unit (confirmation unit) 136b, an area information acquisition unit 136c, a receiving unit 136d, a setting-switching unit 136e, a fluctuation-amount-estimation unit 136g, a determination unit 136h, and a demand-response unit 136f, as shown in FIG. 9.

(1-6-1) Power Consumption Fluctuation Unit

The power consumption fluctuation unit 136a executes control for increasing or reducing the power consumption of the facility devices 40 to 60 (non-demand-response control), regardless of the demand. Non-demand-response control includes controls such as energy conservation control, schedule control, and manual control.

Energy conservation control is control based on the aforementioned information stored in the area information storage section 135a. Specifically, energy conservation control is control based on human presence/absence in the spaces in the property 2. In energy conservation control, for example, the facility devices 40 to 60 are set to OFF in spaces where the human detection sensors detect absence. The timing herein at which the facility devices are set to OFF can be set as desired.

Schedule control is control of the facility devices 40 to 60 that follows a schedule. The schedule is a plan pertaining to the timing of setting the facility devices 40 to 60 to ON/OFF, and/or the operation specifics (set temperature, airflow quantity, illuminance, etc.) when the facility devices 40 to 60 are set to ON. In the schedule, the facility devices 40 to 60 are controlled on the basis of a schedule in which a twenty-four-hour block is divided into any number of time spans and the control specifics in each time span have been established in advance. The schedule is stored in the storage unit 135.

Furthermore, manual control means that the facility devices 40 to 60 are controlled according to user preferences.

The power consumption fluctuation unit 136a increases or reduces the power consumption of the facility devices 40 to 60 on the basis of a command inputted to the input unit 133, a command generated by the operating condition monitoring unit 136b, and a command based on the schedule.

The power consumption fluctuation unit 136a controls the facility devices 40 to 60 on the basis of various commands only when a change permission setting is set to active by the setting-switching unit 136e which is described hereinafter. Specifically, when the change permission setting is set to inactive by the setting-switching unit 136e, non-demand-response control is not executed.

(1-6-2) Operating Condition Monitoring Unit

The operating condition monitoring unit 136b monitors the operating conditions of the facility devices 40 to 60. The operating conditions of the facility devices 40 to 60 include information relating to, for example, the ON/OFF states of the facility devices 40 to 60, the operating modes (air-cooling mode/air-heating mode), intake temperature, set temperature, illuminance, ventilation amount, running time, running rate, operating capability (%) during running, and the like, as described above. The information pertaining to operating conditions also includes information pertaining to the power consumption measured by the power meter 7. The operating capability (%) herein means how great of a capability the air conditioner 40 is actuating, relative to the rated capability of the air conditioner 40.

The operating condition monitoring unit 136b receives the time submitted by the time management unit 132, communicates with the facility devices 40 to 60 and the power meter 7 at predetermined time intervals to monitor the operating conditions, and acquires various information. The operating condition monitoring unit 136b monitors the operating conditions of the facility devices 40 to 60 at predetermined time intervals even after the start of demand-response control. The various information acquired by the operating condition monitoring unit 136b is stored in the aforementioned operating condition storage section 135b along with the date and time the information was acquired.

When the demand is received by the receiving unit 136d described hereinafter, the operating condition monitoring unit 136b monitors the operating conditions of the facility devices 40 to 60 and the obtained information is stored in the operating condition storage section 135b, regardless of the predetermined time intervals. Specifically, the operating condition monitoring unit 136b monitors the operating conditions of the facility devices 40 to 60 immediately before the start of demand-response control and acquires the information of the facility devices 40 to 60 at the timing at which the demand was received.

The operating condition monitoring unit 136b confirms whether or not energy conservation control needs to be executed. Specifically, the operating condition monitoring unit 136b confirms whether or not energy conservation control needs to be executed on the basis of the information stored in the area information storage section 135a and the information stored in the operating condition storage section 135b. More specifically, the operating condition monitoring unit 136b confirms whether or not there are any number of facility devices 40 to 60 in spaces where an absence is detected by the human detection sensors, and whether or not these facility devices 40 to 60 are being driven. Upon confirming there are facility devices 40 to 60 being driven in spaces where no humans are present, the operating condition monitoring unit 136b generates a command to stop these facility devices 40 to 60 and delivers this command to the power consumption fluctuation unit 136a.

(1-6-3) Area Information Acquisition Unit

The area information acquisition unit 136c acquires the information detected by the human detection sensors at a predetermined timing. Specifically, when a new state is detected by a human detection sensor, the area information acquisition unit 136c acquires information indicating this from the human detection sensor. The area information acquisition unit 136c stores the acquired information in the aforementioned area information storage section 135a. The area information acquisition unit 136c continuously acquires information at a predetermined timing even during demand-response control.

(1-6-4) Receiving Unit

The receiving unit 136d receives the demand sent from the energy management apparatus 10. The demand received by the receiving unit 136d is stored in the aforementioned demand storage section 135c.

(1-6-5) Setting-Switching Unit

The setting-switching unit 136e switches a setting relating to the permitting of non-demand-response control (change permission setting) to active/inactive. Specifically, when the demand is received by the receiving unit 136d, the setting-switching unit 136e switches the change permission setting to inactive. Specifically, the setting-switching unit 136e switches the change permission setting to inactive at the starting time of the adjustment time span.

When the change permission setting is switched to inactive, in a case when a command relating to non-demand-response control is then received, the command relating to non-demand-response control is temporarily stored in the storage unit 135.

Furthermore, when it is then determined by the determination unit 136h which is described hereinafter that non-demand-response control can be executed, the setting-switching unit 136e temporarily switches the change permission setting to active. Specifically, the setting-switching unit 136e switches the change permission setting to active before non-demand-response control is executed, and, when non-demand-response is executed, switches the change permission setting to inactive again.

Furthermore, the setting-switching unit 136e switches the change permission setting to active when the ending time of the adjustment time span is reached.

(1-6-6) Fluctuation-Amount-Estimation Unit

When a command pertaining to non-demand-response control is received at or after the starting time of the adjustment time span, the fluctuation-amount-estimation unit 136g estimates the power consumption (estimated fluctuation amount) that fluctuates due to execution of a command pertaining to non-demand-response control.

The estimated fluctuation amount is an estimated value of the power consumption when non-demand-response control is executed, which varies with respect to the power consumption before non-demand-response control is executed (refer to section R1 in FIG. 12), as described above. In other words, the estimated fluctuation amount is the difference between the power consumption per unit time before non-demand-response control is executed, and the power consumption per unit time after non-demand-response control is executed.

More specifically, the fluctuation-amount-estimation unit 136g calculates the estimated fluctuation amount on the basis of the time length from the time when non-demand-response control is started until the ending time of the adjustment time span L1, and the basic information stored in the basic information storage section 135d. In other words, the fluctuation-amount-estimation unit 136g refers to the basic information of the facility devices 40 to 60 that are the objective of non-demand-response control, and estimates the power consumption that will fluctuate from the time when non-demand-response control is started until the ending time of the adjustment time span.

Furthermore, the fluctuation-amount-estimation unit 136g estimates the cost that can be reduced due to non-demand-response control. Specifically, the fluctuation-amount-estimation unit 136g determines the price P2 corresponding to the estimated fluctuation amount. The price P2 corresponding to the estimated fluctuation amount is the fee that is needed or reducible when the power consumption is increased or reduced due to non-demand-response control. Specifically, the fluctuation-amount-estimation unit 136g calculates a fee that is needed due to fluctuation, or a reducible fee, based on the specifics of non-demand-response control and the length of time L1 from the time when non-demand-response control is started to the ending time of the adjustment time span.

For example, non-demand-response control may be energy conservation control, and the command relating to non-demand-response control may be, e.g., received after ten minutes have elapsed in a 60-minute adjustment time period. In this case, the length of time L1 from the time when non-demand-response control is started to the ending time of the adjustment time span would be 50 minutes. Therefore, the fluctuation-amount-estimation unit 136g estimates the power consumption (fluctuation amount) that would be reduced when energy conservation control is executed for 50 minutes, and furthermore estimates the profit (price) P2 received on the basis of the estimated fluctuation amount. The estimated fluctuation amount received by the fluctuation-amount-estimation unit 136g and the price P2 corresponding to the estimated fluctuation amount are stored in the estimated fluctuation amount storage section 135f.

(1-6-7) Determination Unit

The determination unit 136h determines whether permitting non-demand-response control is beneficial. Specifically, the determination unit 136h determines which case, among a case where non-demand-response control is permitted and a case where non-demand-response control is not permitted, presents a greater advantage, and determines whether permitting non-demand-response control is beneficial on the basis of the result of determination.

Specifically, the determination unit 136h determines whether permitting non-demand-response control is beneficial, on the basis of the information relating to an incentive stored in the incentive storage section 135e and the information relating to the estimated fluctuation amount stored in the estimated fluctuation amount storage section 135f.

More specifically, the determination unit 136h compares the price P1 received as an incentive and the price P2 corresponding to the estimated fluctuation amount, and determines whether or not to execute non-demand-response control. In other words, the determination unit 136h compares the price P1 received when execution of non-demand-response control is not permitted and the power consumption is maintained at the target power consumption during the adjustment time span, and the price P2 received due to non-demand-response control (e.g., energy conservation control) when execution of non-demand-response control is permitted and the power consumption deviates from the target power consumption during the adjustment time span.

When the result of comparing the price P1 received as an incentive and the price P2 corresponding to the estimated fluctuation amount indicates that the price P1 received as an incentive would be greater than the price P2 corresponding to the estimated fluctuation amount, the determination unit 136h determines that non-demand-response control cannot be executed. However, when the result indicates that the price P2 corresponding to the estimated fluctuation amount would be greater than the price P1 received as an incentive, the determination unit 136h determines that non-demand-response control can be executed. In other words, when the price imposed for power consumed due to non-demand-response control (energy conservation control) during the adjustment time span would be greater than the price imposed when the demand-response contract is upheld, the determination unit 136h does not permit non-demand-response control. However, when the price imposed for power consumed due to execution of non-demand-response control (energy conservation control) during the adjustment time span would be less than the price imposed when the demand-response contract is upheld, the determination unit 136h permits non-demand-response control.

When non-demand-response control is permitted by the determination unit 136h, the change permission setting is switched to active by the setting-switching unit 136e as described above, and then non-demand-response control is executed by the power consumption fluctuation unit 136a.

(1-6-8) Demand-Response Unit

The demand-response unit 136f executes demand-response control. Demand-response control is control for adjusting the power consumption of the facility devices 40 to 60 on the basis of the demand. In other words, the demand-response unit 136f controls the facility devices 40 to 60 so as to satisfy the conditions stipulated by the demand.

Specifically, the demand-response unit 136f starts demand-response control when the time stipulated by the demand (the starting time of the adjustment time span) is reached. In demand-response control, the facility devices 40 to 60 are controlled so that the total amount of power consumption per unit time of the facility devices 40 to 60 installed in the property 2 coincides with the target power consumption tw stipulated by the demand.

In demand-response control, which of the facility devices 40 to 60 to actuate and at which magnitude of an operating capability to actuate the facility devices 40 to 60 may be decided in any manner. For example, the operating capability of the driven air conditioner 40 may be lowered uniformly, and facility devices may be stopped which have a lower priority order on the basis of the priority order established in advance for the facility devices 40 to 60.

(2) Flow of Process in Control Apparatus

Figure 10:
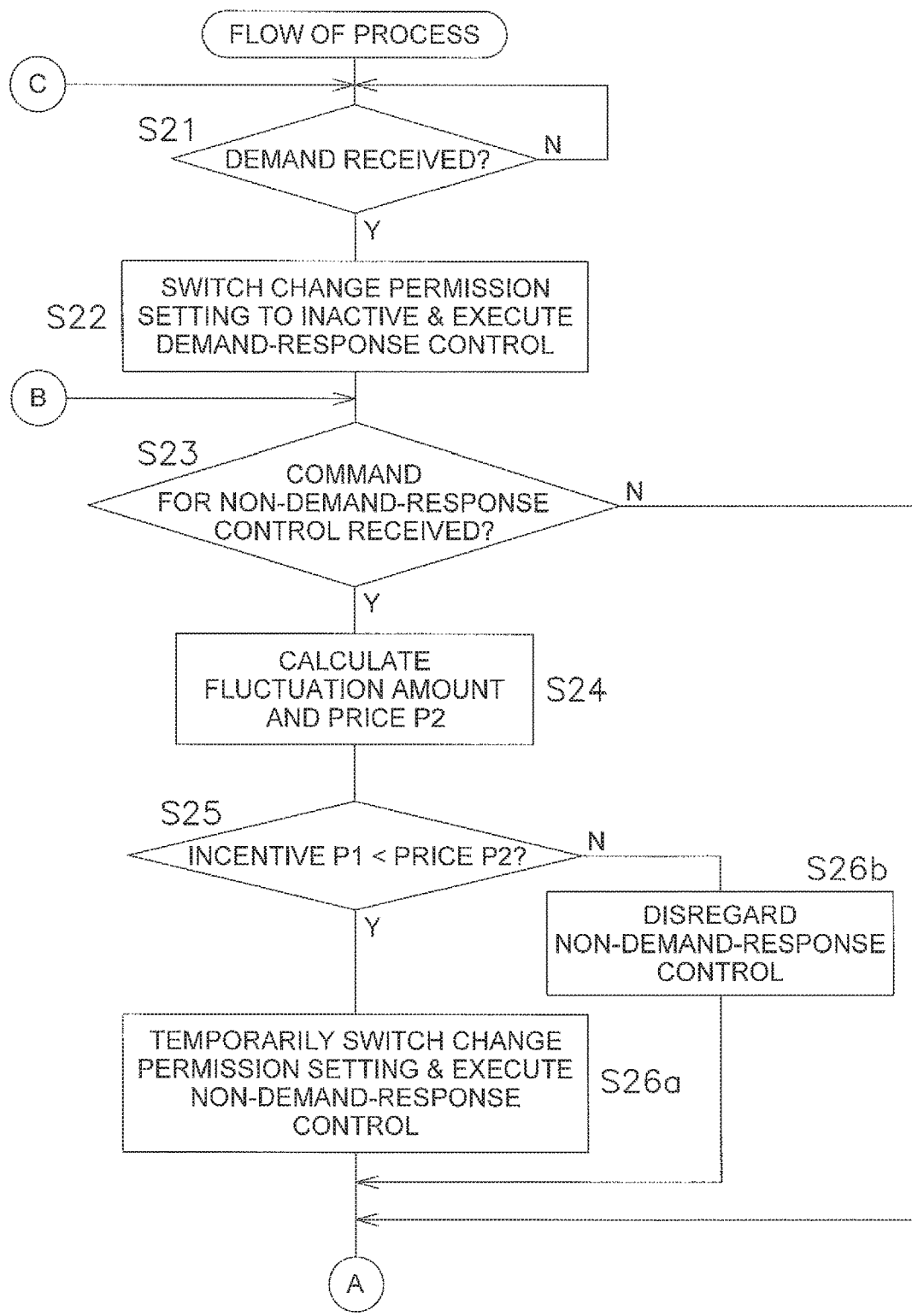
FIG. 10 is a diagram showing the flow of the process of the control apparatus according to the second embodiment.
Figure 11:
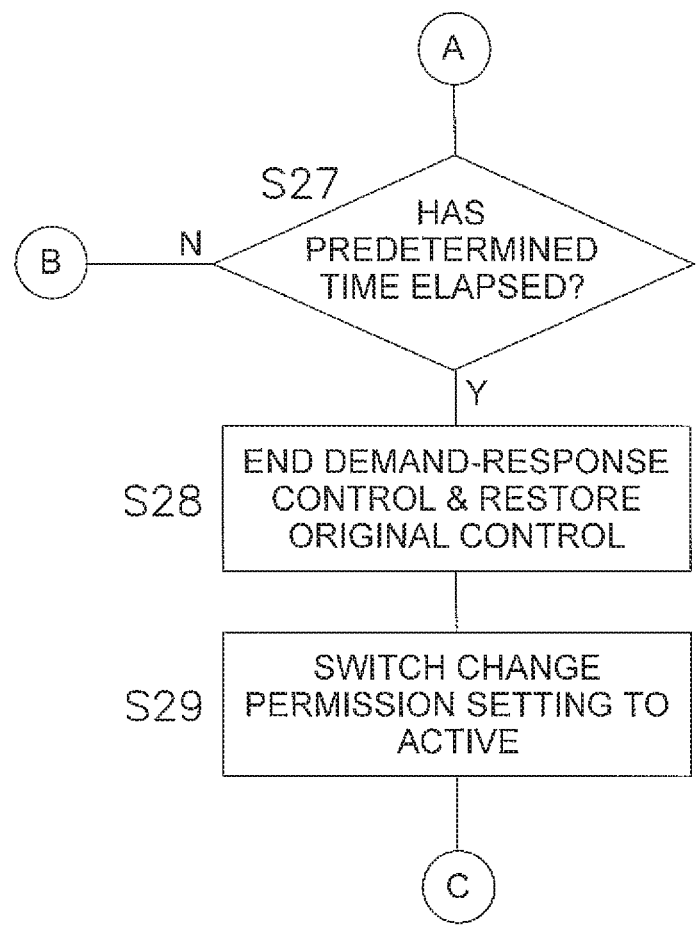
FIG. 11 is a diagram showing the flow of the process of the control apparatus according to the second embodiment.

Next, FIGS. 10 and 11 are used to describe the flow of the process relating to the demand in the control apparatus 130. The control apparatus 130 executes non-demand-response control until a demand is received. Specifically, the control apparatus 130 executes energy conservation control, schedule control, and manual control as appropriate until demand-response control is started.

First, in step S21, an assessment is made as to whether or not a demand has been received by the receiving unit 136d. In step S21, the system waits until a demand is received, and after a demand is received, the demand is stored in the demand storage section 135c and the process advances to step S22.

In step S22, the change permission setting is switched to inactive by the setting-switching unit 136e. Commands received by the input unit 133 and commands received by the power consumption fluctuation unit 136a are thereby temporarily stored in the storage unit 135. Demand-response control is executed by the demand-response unit 136f. The demand-response unit 136f controls the facility devices 40 to 60 on the basis of the demand stored in the demand storage section 135c. Specifically, the demand-response unit 136f controls the facility devices 40 to 60 so that in the time span (adjustment time span) stipulated by the demand, the total amount of power consumption of the facility devices 40 to 60 in the property 2 coincides with the target power consumption tw stipulated by the demand. The setting switch by the setting-switching unit 136e and the execution of demand-response control by the demand-response unit 136f are performed at the starting time of the adjustment time span. The process then advances to step S23.

In step S23, a determination is made as to whether or not a command for non-demand-response control has been received. When a command for non-demand-response control is not received in step S23, the process advances to step S27. When a command for non-demand-response control is received in step S23, the process advances to step S24.

In step S24, the fluctuation amount of power consumption is estimated by the fluctuation-amount-estimation unit 136*g*. Specifically, the fluctuation-amount-estimation unit 136*g* calculates an estimated value of power consumption when non-demand-response control is executed, which varies with respect to the power consumption before non-demand-response control is executed. The fluctuation-amount-estimation unit 136*g* also determines the price P2 corresponding to the estimated fluctuation amount. The price P2 corresponding to the estimated fluctuation amount is a fee that is needed or reducible when the power amount is increased or reduced according to the estimated fluctuation amount. The estimated fluctuation amount and the price P2 corresponding to the estimated fluctuation amount are stored in the estimated fluctuation amount storage section 135*f*. The process then advances to step S25.

In step S25, a determination is made by the determination unit 136*h* as to which case presents a greater advantage: where non-demand-response control is permitted or where non-demand-response control is not permitted. Specifically, the determination unit 136*h* compares the price P1 received due to the incentive stored in the incentive storage section 135*e*, and the price P2 corresponding to the estimated fluctuation amount stored in the estimated fluctuation amount storage section 135*f*. Specifically, the determination unit 136*h* compares the price P1 received when non-demand-response control is not permitted and the power consumption is maintained at the target power consumption during the adjustment time span, and the price P2 received due to non-demand-response control (e.g., energy conservation control) when non-demand-response control is permitted and the power consumption deviates from the target power consumption during the adjustment time span. When the price P1 received due to the incentive would be less than the price P2 corresponding to the estimated fluctuation amount in step S25, the process advances to step S26*a*, and when the price P1 received due to the incentive would be greater than the price P2 corresponding to the estimated fluctuation amount, the process advances to step S26*b*.

In step S26*a*, the change permission setting is temporarily switched to active by the setting-switching unit 136*e*. Also in step S26*a*, non-demand-response control is executed by the power consumption fluctuation unit 136*a*. The process then advances to step S27.

However, in step S26*b*, non-demand-response control is disregarded, and the process then advances to step S27.

In step S27, a determination is made as to whether or not a predetermined time duration has elapsed, on the basis of the information obtained from the time management unit 132. In other words, in step S27, a determination is made as to whether or not the ending time of the adjustment time period has arrived. When the predetermined time duration has not elapsed in step S27, the process returns to step S23, and when the predetermined time duration has elapsed, the process advances to step S28.

In step S28, demand-response control is ended, and the control prior to the start of demand-response control is restored in the facility devices 40 to 60 on the basis of the information stored in the operating condition storage section 135*b*. The process then advances to step S29.

In step S29, the change permission setting is switched to active by the setting-switching unit 136*e*. Specifically, a setting is made in step S29 so that commands for non-demand-response control can be executed as appropriate. The process then returns to step S21.

(3) Characteristics (3-1)

The command apparatus 130 according to the above embodiment comprises the receiving unit 136*d*, the demand-response unit 136*f*, the power consumption fluctuation unit 136*a*, and the setting-switching unit (setting unit) 136*e*. The receiving unit 136*d* receives a demand pertaining to power consumption sent from the energy management apparatus 10. When the demand is received by the receiving unit 136*d*, the demand-response unit 136*f* executes demand-response control. Demand-response control is control for adjusting the power consumption of facility devices 40 to 60 located on a property 2, in response to a demand. The power consumption fluctuation unit 136*a* executes non-demand-response control. Non-demand-response control is control for increasing or reducing the power consumption of the facility devices, regardless of the demand. The setting-switching unit 136*e* sets non-demand-response control to active or inactive. Furthermore, the control apparatus 130 comprises a determination unit 136*h*. The determination unit 136*h* determines whether or not to execute non-demand-response control during a predetermined time span (adjustment time span) during which demand-response control is executed. The setting-switching unit 136*e* sets non-demand-response control to active or inactive on the basis of the result obtained by the assessment unit 136*h*.

In the control apparatus 130, a determination is made by the determination unit 136*h* as to whether or not to execute non-demand-response control during the adjustment time span. Non-demand-response control is set to active or inactive by the setting-switching unit 136*e* on the basis of the result of determination by the determination unit 136*h*. Preferred control can thereby be executed in accordance with a situation in which a command relating to non-demand-response control is received.

As described in the first embodiment, when non-demand-response control (e.g., energy conservation control) is executed in the properties 2 during demand-response control, cases arise in which the conditions of the target power consumption stipulated by the demand cannot be met. As a result, the properties 2 cannot receive the incentive (refer to FIG. 5).

However, in the control apparatus 130 according to the second embodiment, a determination is made by the determination unit 136*h* as to whether or not to execute non-demand-response control during the adjustment time span. Non-demand-response control is set to active or inactive by the setting-switching unit 136*e* on the basis of the result of determination by the determination unit 136*h*.

Specifically, in the control apparatus 130, when a demand is received from the energy management apparatus 10, demand-response control is executed by the demand-response unit 136*f*. When a command pertaining to non-demand-response control is received during the execution of demand-response control, a determination is made by the determination unit 136*h* as to whether or not to execute non-demand-response control. Specifically, a determination is made in accordance with the situation as to whether or not to execute non-demand-response control under demand-response control, and therefore an effective control can be selected for the facility devices 40 to 60.

(3-2)

The control apparatus 130 according to the above embodiment further comprises an incentive information storage section 135*e* and a fluctuation-amount-estimation unit (reducible-cost-estimation unit) 136*g*. The incentive information storage section 135*e* stores information relating to an incentive received when the conditions stipulated in the demand are met. The fluctuation-amount-estimation unit 136g estimates the cost that can be reduced due to non-demand-response control. The determination unit 136h compares the information relating to an incentive and the price P2 estimated by the fluctuation-amount-estimation unit 136g, and determines whether or not to execute non-demand-response control while demand-response control is being executed.

Figure 12:
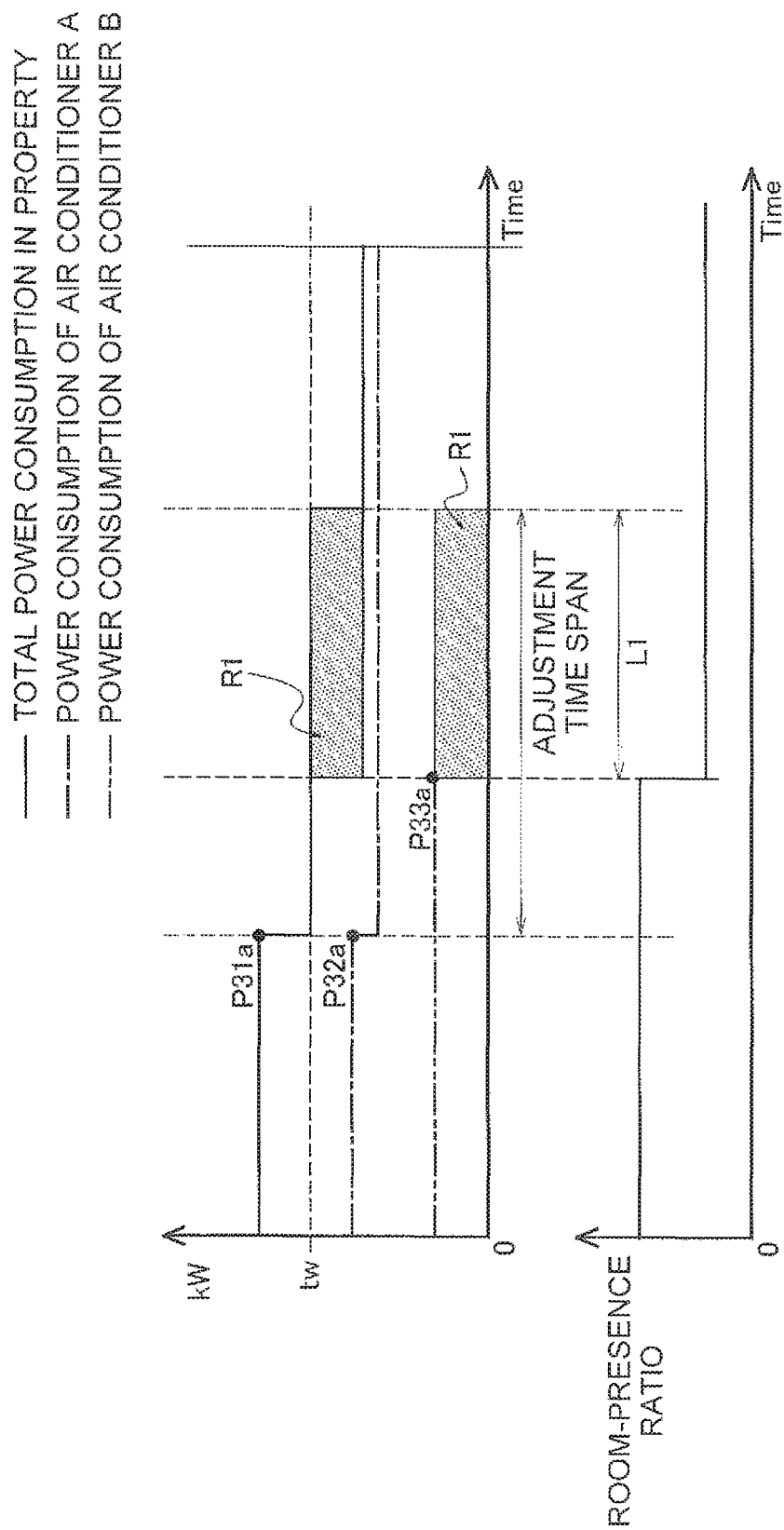
FIG. 12 is a diagram illustrating the processes of the control apparatus according to the second embodiment.

Specifically, FIG. 12 is used to give a description. For example, the property 2 includes spaces A, B; an air conditioner A being set up in space A, and an air conditioner B being set up in space B. When the adjustment time span starts, the power consumption of the air conditioner A is minimized (point P32a). As a result, the total power consumption during the adjustment time span changes from the value indicated at point P31a so as to coincide with the target power consumption tw. The state of space B then changes during the adjustment time span. At this time, the fluctuation-amount-estimation unit 136g first calculates an estimated value (estimated fluctuation amount) of the power consumption when non-demand-response control is executed, which varies with respect to the power consumption before non-demand-response control is executed (refer to section R1 in FIG. 12). Specifically, the estimated fluctuation amount of the power consumption when the power consumption of the air conditioner B changes to 0 (refer to point P33a) is calculated. The fluctuation-amount-estimation unit 136g also determines the price P2 corresponding to the estimated fluctuation amount. The price P2 corresponding to the estimated fluctuation amount is the fee that is needed or reducible when the power amount is increased or reduced according to the estimated fluctuation amount (refer to section R1 in FIG. 12). The determination unit 136h compares the profit (price) P1 received when the demand-response contract is upheld and the profit (price) P2 received when non-demand-response control is executed, and determines which control would present a greater received profit. Demand-response control or non-demand-response control is executed in accordance with the result of determination.

For example, when energy conservation control is executed as non-demand-response control, and energy conservation presents a great advantage, cases arise in which energy conservation control presents a greater received advantage than does upholding the demand-response contract. Specifically, cases arise in which executing energy conservation control presents a greater profit, even though the incentive is forfeited. In such cases, it is not absolutely necessary to meet the demand.

In the control apparatus 130 according to the above embodiment, the price P1 received as an incentive and the reducible cost (price) P2 are compared, and a determination is made as to whether or not to execute non-demand-response control. As a result, a profit can thereby be received due to the profit obtained through energy conservation, even when the demand-response contract cannot be complied with and no incentive is received. The overall necessary cost can also be minimized.

(3-3)

In the control apparatus 130 according to the above embodiment, the demand includes conditions relating to a predetermined time span (adjustment time span) during which demand-response control is executed. Non-demand-response control is energy conservation control. The fluctuation-amount-estimation unit 136g estimates the cost that can be reduced due to non-demand-response control on the basis of the length of time L1 from the time when energy conservation control is started to the ending time of the adjustment time span (refer to FIG. 12).

When a predetermined energy conservation control is executed, the profit received due to energy conservation control is different when energy conservation control is executed immediately after demand-response control is started than when energy conservation control is executed immediately before demand-response control is ended. Specifically, when the specifics of energy conservation control are the same, the profit received due to energy conservation control changes depending on the length of time L1 during which energy conservation control is executed in the adjustment time span. When the profit received due to energy conservation control would be greater than the profit received due to the incentive, the profit received due to the incentive may be forfeited; however, when the profit received due to energy conservation control would be less than the profit received due to the incentive, the profit received due to the incentive should not be forfeited.

In the control apparatus 130 according to the above embodiment, the cost that can be reduced due to non-demand-response control is estimated on the basis of the specifics of the energy conservation control (the extent of energy conservation) and the length of time L1 from the time when the energy conservation control is started to the ending time of the adjustment time span. A determination can thereby be made as to whether or not to execute non-demand-response control, with the advantages received due to energy conservation control being sufficiently taken into account.

(3-4)

Additionally, in the control apparatus 130 according to the above embodiment, the operating condition monitoring unit (confirmation unit) 136b confirms whether or not non-demand-response control needs to be executed after demand-response control is ended by the demand-response unit 136f. When it is assessed that non-demand-response control needs to be executed, the operating condition monitoring unit 136b generates a command pertaining to non-demand-response control and delivers this command to the power consumption fluctuation unit 136a. The power consumption fluctuation unit 136a executes non-demand-response control on the basis of the command delivered by the operating condition monitoring unit 136b.

Thus, in the control apparatus 130 according to the above embodiment as well, energy conservation control can be started immediately after the end of the adjustment time span when the state of the space in the property 2 changes, during the adjustment time span, to a state in which energy conservation control can be executed. Specifically, the facility devices 40 to 60 can be controlled under desired conditions soon after the end of the adjustment time span.

(4) Modifications (4-1) Modification 2A

In the energy management system 200 as well, a demand sent from the energy management apparatus 10 to the control apparatus 130 may be generated on the basis of multiple pieces of suppression possibility information presented to the power company 1 by the properties 2. In the energy management apparatus 10, the power amount that had been planned is thereby consumed in the properties 2, and energy can therefore be managed in a suitable manner throughout the entire energy management system 200.

(4-2) Modification 2B

In the present embodiment as well, energy conservation control may include control based on external factors, similarly to the first embodiment. It would thereby be possible to improve the energy conservation effect by controlling the facility devices 40 to 60 in a manner suited to spaces having a greater amount of solar radiation and spaces having a lesser amount of solar radiation.

(4-3) Modification 2C

The fluctuation-amount-estimation unit 136g according to the above embodiment calculates a estimated fluctuation amount and then determines a price P2 corresponding to the estimated fluctuation amount. At this time, the price P2 corresponding to the estimated fluctuation amount includes a fee that is needed or reducible when the amount of power is increased or reduced according to the estimated fluctuation amount.

First, the fluctuation-amount-estimation unit 136g herein may be configured so as to assess whether non-demand-response control would cause the current power consumption to change so as to increase, or to change so as to decrease. In other words, the fluctuation-amount-estimation unit 136g may be configured so as to assess whether non-demand-response control would cause the current power consumption to exceed the target power consumption, or to fall below the target power consumption.

Furthermore, the determination unit 136h is configured so as to determine whether permitting non-demand-response control is beneficial, on the basis of the result of determination by the fluctuation-amount-estimation unit 136g. Specifically, the determination unit 136h may determine that non-demand-response control cannot be executed when it is determined by the fluctuation-amount-estimation unit 136g that non-demand-response control would cause the current power consumption to change so as to increase. Additionally, the determination unit 136h may be configured so as to determine that non-demand-response control can be executed when it is determined by the fluctuation-amount-estimation unit 136g that non-demand-response control would cause the current power consumption to change so as to decrease, and to then estimate the price P2 corresponding to the estimated fluctuation amount.

Thus, the advantages received due to upholding the demand-response contract and the advantages received due to non-demand-response control are compared, and received advantages can be conclusively increased.

(4-4) Modification 2D

In the above embodiment, the determination unit 136h compares the price P1 received when the power consumption is maintained at the target power consumption during the adjustment time span, and the price P2 received due to non-demand-response control when execution of non-demand-response control is permitted and the power consumption deviates from the target power consumption during the adjustment time span. An example of the price P2 received due to non-demand-response control herein includes the price P2 received due to energy conservation control.

Energy conservation control herein may include control for conserving energy, instead of or in addition to the control described above based on human presence/absence as detected by the human detection sensors.

In this case as well, control can be selectively executed in the properties 2 so that advantages are effectively received.

What is claimed is:

1. A control apparatus, comprising:
    a control unit including a CPU; and
    an incentive information storage section including a hard disk configured to store information relating to a price received as an incentive when conditions stipulated by the demand are met,
    the CPU serving as
    a receiving unit configured to receive a demand relating to power consumption sent from an energy management apparatus,
    a demand-response unit configured to execute a demand-response control in order to adjust power consumption of facility devices set up in a property in accordance with the demand when the demand is received by the receiving unit,
    a power consumption fluctuation unit configured to execute a non-demand-response control in order to increase or decrease power consumption of the facility devices regardless of the demand,
    a setting unit configured to set the non-demand-response control to active or inactive,
    a determination unit configured to determine whether or not to execute the non-demand-response control during a predetermined time span during which the demand-response control is executed, and
    a reducible-cost-estimation unit configured to estimate a cost that can be reduced due to the non-demand-response control by calculating an estimated value of power consumption when the non-demand-response control is executed which varies with respect to power consumption before the non-demand-response control is executed,
    the setting unit being further configured to set the non-demand-response control to active or inactive based on a result obtained by the determination unit, and
    the determination unit being further configured to
        compare the information relating to the incentive and the cost estimated by the reducible-cost-estimation unit, and
        determine whether or not to execute the non-demand-response control while the demand-response control is being executed based on a result of comparison of the information relating to the price received as an incentive and the cost estimated by the reducible-cost-estimation unit.

2. The control apparatus according to claim 1, wherein the setting unit is further configured to set the non-demand-response control to inactive during a predetermined time span during which the demand-response control is executed.

3. The control apparatus according to claim 1, wherein the demand includes conditions relating to a predetermined time span during which the demand-response control is executed,
the non-demand-response control is an energy conservation control, and
the reducible-cost-estimation unit is further configured to estimate the cost that can be reduced due to the non-demand-response control based on a length of time from when energy conservation control is started to an ending time of the predetermined time span.

4. The control apparatus according to claim 1, wherein the CPU further serves as a confirmation unit configured to confirm whether or not the non-demand-response control needs to be executed after the demand-response control by the demand-response unit has ended, and
the power consumption fluctuation unit is further configured to execute the non-demand-response control when the confirmation unit confirms that the non-demand-response control needs to be executed.

5. The control apparatus according to claim 1, wherein the non-demand-response control includes at least one of a schedule control, a manual control, and an energy conservation control, and the energy conservation control is based on either
an amount of solar radiation in the spaces where the facility devices are set up or
a presence/absence of humans in the spaces where the facility devices are set up.

6. The control apparatus according to claim 2, wherein
the CPU further serves as a confirmation unit configured to confirm whether or not the non-demand-response control needs to be executed after the demand-response control by the demand-response unit has ended, and
the power consumption fluctuation unit is further configured to execute the non-demand-response control when the confirmation unit confirms that the non-demand-response control needs to be executed.

7. The control apparatus according to claim 2, wherein
the non-demand-response control includes at least one of a schedule control, a manual control, and an energy conservation control, and
the energy conservation control is based on either
an amount of solar radiation in the spaces where the facility devices are set up or
a presence/absence of humans in the spaces where the facility devices are set up.

8. The control apparatus according to claim 4, wherein
the non-demand-response control includes at least one of a schedule control, a manual control, and an energy conservation control, and
the energy conservation control is based on either
an amount of solar radiation in the spaces where the facility devices are set up or
a presence/absence of humans in the spaces where the facility devices are set up.

* * * * *